(12) United States Patent
Tong

(10) Patent No.: US 12,330,459 B2
(45) Date of Patent: Jun. 17, 2025

(54) THREE-PORT ADJUSTER

(71) Applicant: Fox Factory, Inc., Duluth, GA (US)

(72) Inventor: Ivan Tong, San Diego, CA (US)

(73) Assignee: Fox Factory, Inc., Duluth, GA (US)

( * ) Notice: Subject to any disclaimer, the term of this patent is extended or adjusted under 35 U.S.C. 154(b) by 702 days.

(21) Appl. No.: 17/588,890

(22) Filed: Jan. 31, 2022

(65) Prior Publication Data

US 2022/0242186 A1    Aug. 4, 2022

Related U.S. Application Data

(60) Provisional application No. 63/144,407, filed on Feb. 1, 2021.

(51) Int. Cl.
*B60G 13/08* (2006.01)

(52) U.S. Cl.
CPC .......... *B60G 13/08* (2013.01); *B60G 2206/41* (2013.01); *B60G 2500/11* (2013.01)

(58) Field of Classification Search
CPC . B60G 13/08; B60G 2206/41; B60G 2500/11
USPC .............................. 188/322.23, 322.19, 322.2
See application file for complete search history.

(56) References Cited

U.S. PATENT DOCUMENTS

| | | | | |
|---|---|---|---|---|
| 4,936,423 A * | 6/1990 | Karnopp | ................ | B60G 17/08 188/266.5 |
| 5,586,627 A * | 12/1996 | Nezu | .......................... | F16F 9/46 188/266.6 |
| 5,682,980 A * | 11/1997 | Reybrouck | ............ | B60G 17/04 280/124.16 |
| 5,996,748 A * | 12/1999 | Nezu | ......................... | F16F 9/46 188/266.5 |
| 6,102,171 A * | 8/2000 | Rottenberger | ........ | F16K 15/042 137/512.1 |
| 6,296,092 B1 | 10/2001 | Marking et al. | | |
| 7,699,147 B2 * | 4/2010 | Preukschat | ............ | B60G 17/04 188/282.4 |
| 8,393,448 B2 * | 3/2013 | Kunstle | ................... | F16F 9/467 188/300 |
| 8,627,932 B2 | 1/2014 | Marking | | |
| 8,838,335 B2 | 9/2014 | Bass et al. | | |
| 8,857,580 B2 | 10/2014 | Marking | | |
| 9,033,122 B2 | 5/2015 | Ericksen et al. | | |
| 9,120,362 B2 | 9/2015 | Marking | | |
| 9,239,090 B2 | 1/2016 | Marking et al. | | |
| 9,353,818 B2 | 5/2016 | Marking | | |
| 9,452,654 B2 | 9/2016 | Ericksen et al. | | |
| 9,623,716 B2 | 4/2017 | Cox | | |

(Continued)

FOREIGN PATENT DOCUMENTS

WO    2020179682 A1    9/2020

OTHER PUBLICATIONS

European Search Report for European Application No. 22154582.5, 12 pages, Jul. 4, 2022.

*Primary Examiner* — Christopher P Schwartz

(57) ABSTRACT

A three-port adjuster for a vehicle suspension damper is described. The three-port adjuster includes a first port to provide a fluid flow path to a compression region of a damping cylinder, a second port to provide a fluid flow path to a rebound region of a damping cylinder, a third port to provide a fluid flow path to a reservoir chamber, and at least one valve to control a fluid flow therethrough.

3 Claims, 24 Drawing Sheets

(56) References Cited

U.S. PATENT DOCUMENTS

| | | | |
|---|---|---|---|
| 9,682,604 B2 | 6/2017 | Cox et al. | |
| 9,797,467 B2 | 10/2017 | Wootten et al. | |
| 9,879,744 B2 * | 1/2018 | Haller | F16F 9/46 |
| 10,036,443 B2 | 7/2018 | Galasso et al. | |
| 10,040,329 B2 | 8/2018 | Ericksen et al. | |
| 10,047,817 B2 | 8/2018 | Ericksen et al. | |
| 10,060,499 B2 | 8/2018 | Ericksen et al. | |
| 10,279,641 B2 * | 5/2019 | Anderson | H02K 7/1876 |
| 10,415,662 B2 | 9/2019 | Marking | |
| 10,576,803 B2 | 3/2020 | Marking et al. | |
| 10,737,546 B2 * | 8/2020 | Tong | F16F 9/065 |
| 10,844,926 B2 * | 11/2020 | Tsuji | F16F 9/3214 |
| 11,635,122 B2 * | 4/2023 | Deferme | F16F 9/46 |
| | | | 188/266.2 |
| 2016/0061283 A1 * | 3/2016 | Yamashita | F16F 9/3484 |
| | | | 188/313 |
| 2016/0075204 A1 | 3/2016 | Marking et al. | |
| 2018/0010666 A1 * | 1/2018 | Marking | B60G 17/08 |
| 2018/0339566 A1 | 11/2018 | Ericksen et al. | |
| 2019/0154100 A1 | 5/2019 | Coaplen et al. | |
| 2023/0356558 A1 * | 11/2023 | Taylor | B60G 17/08 |

\* cited by examiner

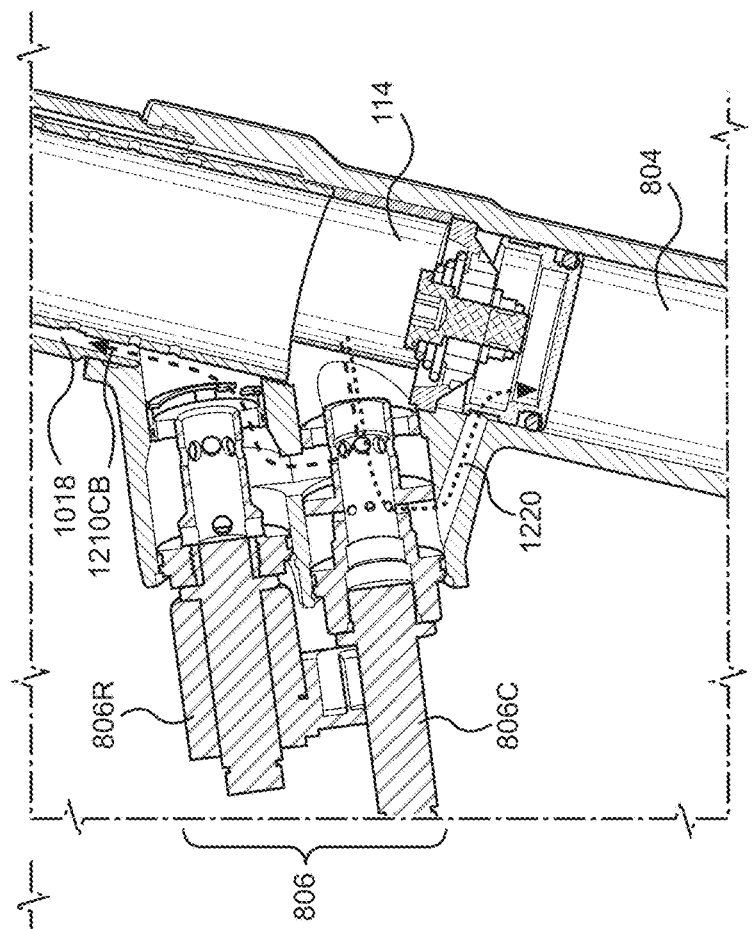
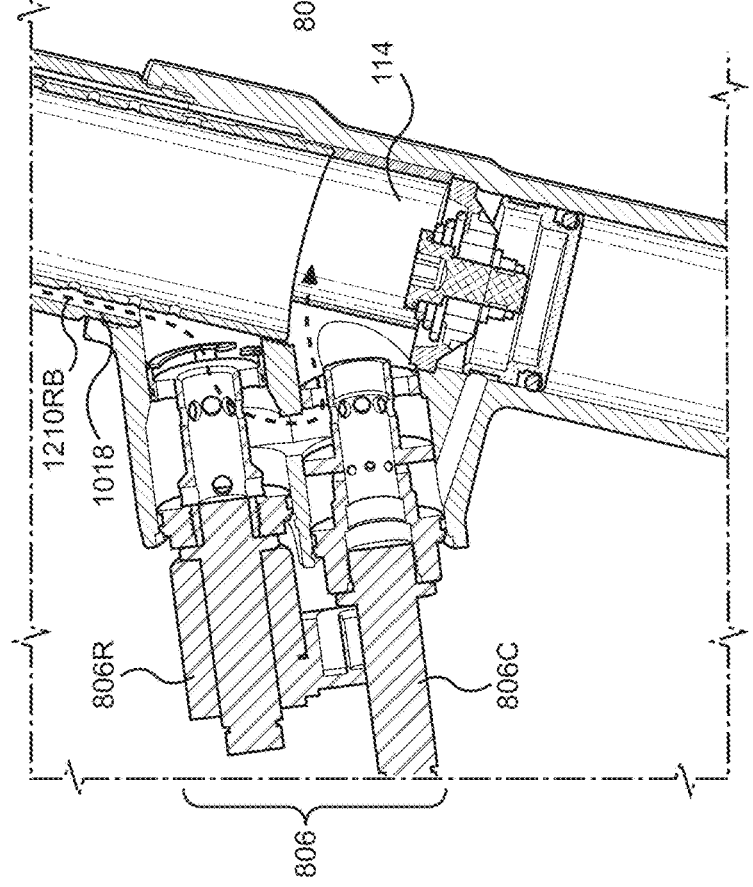

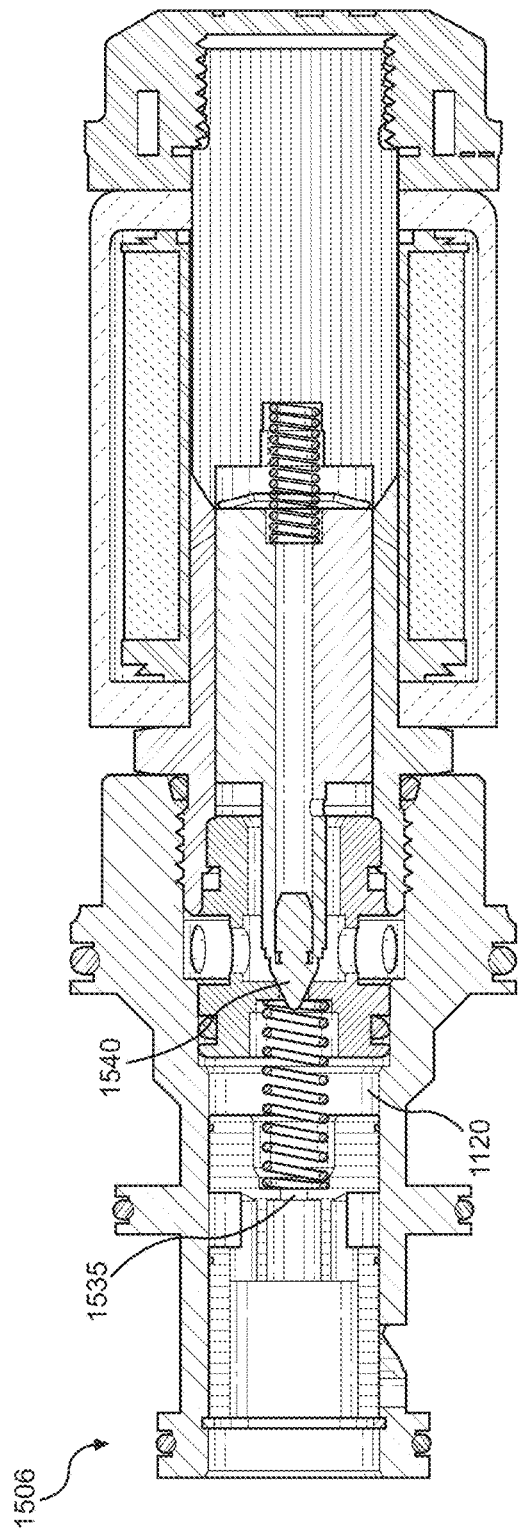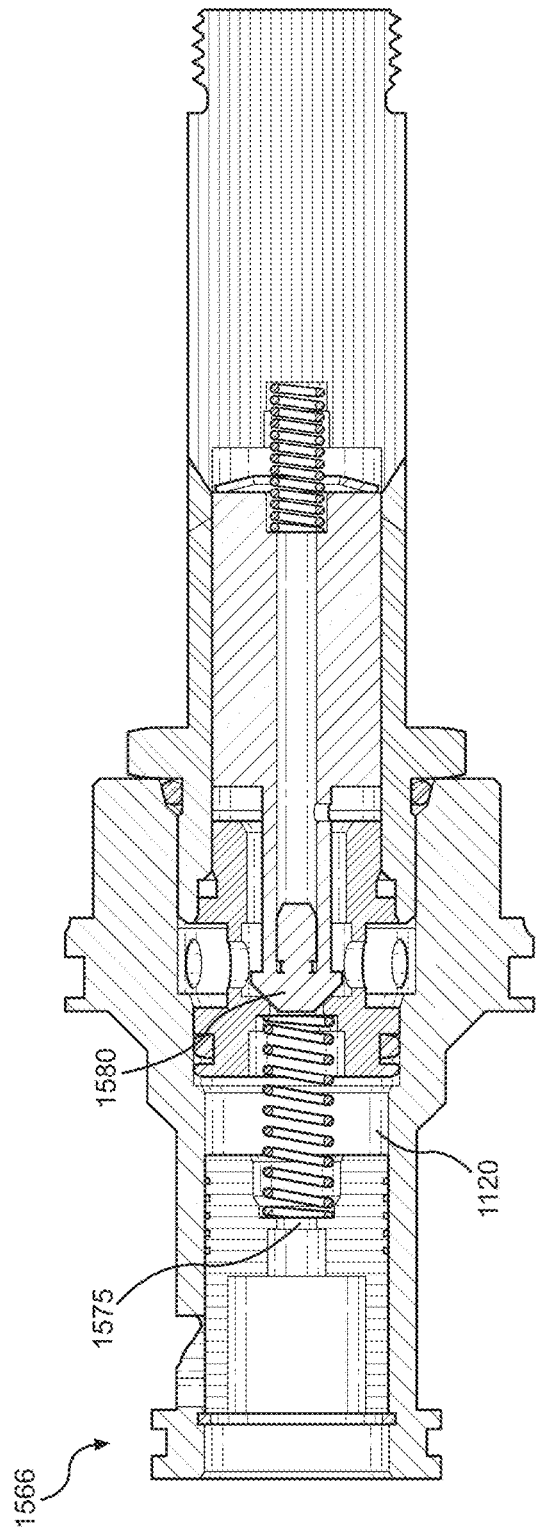

THREE-PORT ADJUSTER

CROSS-REFERENCE TO RELATED APPLICATIONS

This application claims the benefit of and claims priority of co-pending U.S. provisional patent application Ser. No. 63/144,407, filed on Feb. 1, 2021, entitled "THREE-PORT VALVE" by Ivan Tong, assigned to the assignee of the present application, which is herein incorporated by reference in its entirety.

FIELD OF THE INVENTION

Embodiments generally relate to a damper assembly for a vehicle.

BACKGROUND

Shock absorbers (e.g., dampers) are used in numerous different vehicles and configurations to absorb some or all of a movement that is received at a first portion of a vehicle before it is transmitted to a second portion of the vehicle. For example, when a wheel hits a pothole, the encounter will cause an impact force on the wheel. However, by utilizing suspension components including one or more dampers, the impact force can be significantly reduced or even absorbed completely before it is transmitted to a person on a seat of the vehicle.

Conventional damping components provide a constant damping rate during compression or extension through the entire length of the stroke. Other conventional damping components provide mechanisms for varying the damping rate. Further, in the world of bicycles, damping components are most prevalently mechanical. As various types of recreational and sporting vehicles continue to become more technologically advanced, what is needed in the art are improved techniques for varying the damping rate.

BRIEF DESCRIPTION OF THE DRAWINGS

Aspects of the present invention are illustrated by way of example, and not by way of limitation, in the accompanying drawings, wherein:

FIG. 12A is a sectional view of the rebound bypass flow path of the 3-port adjuster, in accordance with an embodiment.

FIG. 12B is a sectional view of the compression bypass flow path of the 3-port adjuster, in accordance with an embodiment.

FIG. 15B is a cross-sectional view of a frequency dependent 2-stage single valve 3-port adjuster, in accordance with an embodiment.

FIG. 15C is a frequency dependent 2-stage single valve 2-port adjuster, in accordance with an embodiment.

The drawings referred to in this description should be understood as not being drawn to scale except if specifically noted.

DESCRIPTION OF EMBODIMENTS

The detailed description set forth below in connection with the appended drawings is intended as a description of various embodiments of the present invention and is not intended to represent the only embodiments in which the present invention may be practiced. Each embodiment described in this disclosure is provided merely as an example or illustration of the present invention, and should not necessarily be construed as preferred or advantageous over other embodiments. In some instances, well known methods, procedures, objects, and circuits have not been described in detail as not to unnecessarily obscure aspects of the present disclosure.

Notation and Nomenclature

Unless specifically stated otherwise as apparent from the following discussions, it is appreciated that throughout the present Description of Embodiments, discussions utilizing terms such as "sensing" or the like, often refer to the actions and processes of a computer system or similar electronic computing device (or portion thereof) such as, but not limited to, a control system. (See FIG. 7) The electronic computing device manipulates and transforms data represented as physical (electronic) quantities within the electronic computing device's processors, registers, and/or memories into other data similarly represented as physical quantities within the electronic computing device's memories, registers and/or other such information storage, processing, transmission, and/or display components of the electronic computing device or other electronic computing device(s). Under the direction of computer-readable instructions, the electronic computing device may carry out operations of one or more of the methods described herein.

Overview of Discussion

Embodiments described herein include 2-port and a 3-port adjusters. In general, a 3-port adjuster, refers to a valve system that has one port fluidly coupled with a compression chamber, one port fluidly coupled with rebound chamber, and one port fluidly coupled with the reservoir (or reservoir chamber). As discussed herein, the 3-port adjuster may be used to control compression and/or rebound aspects of the damper. In one embodiment, the 3-port adjuster has a larger control range for the same pressure balance. In one embodiment, the design discussed herein is backward compatible with current internal bypass position sensitive technology.

Two Port Electronic Valve Assembly and Operation Thereof

Figure 1:
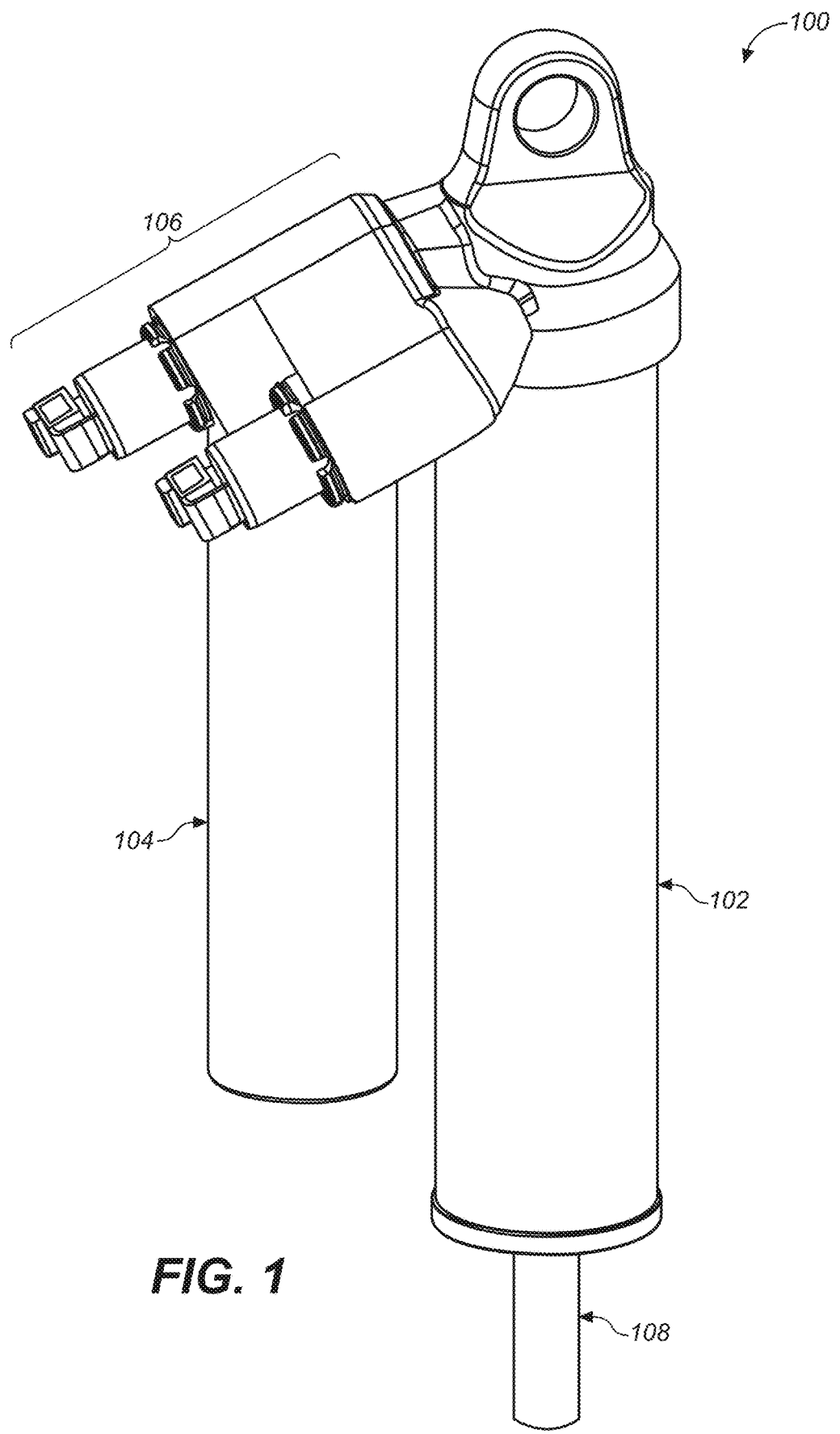
FIG. 1 is a perspective view of a vehicle suspension damper including an electronic valve assembly, in accordance with an embodiment of the present invention.
Figure 2:
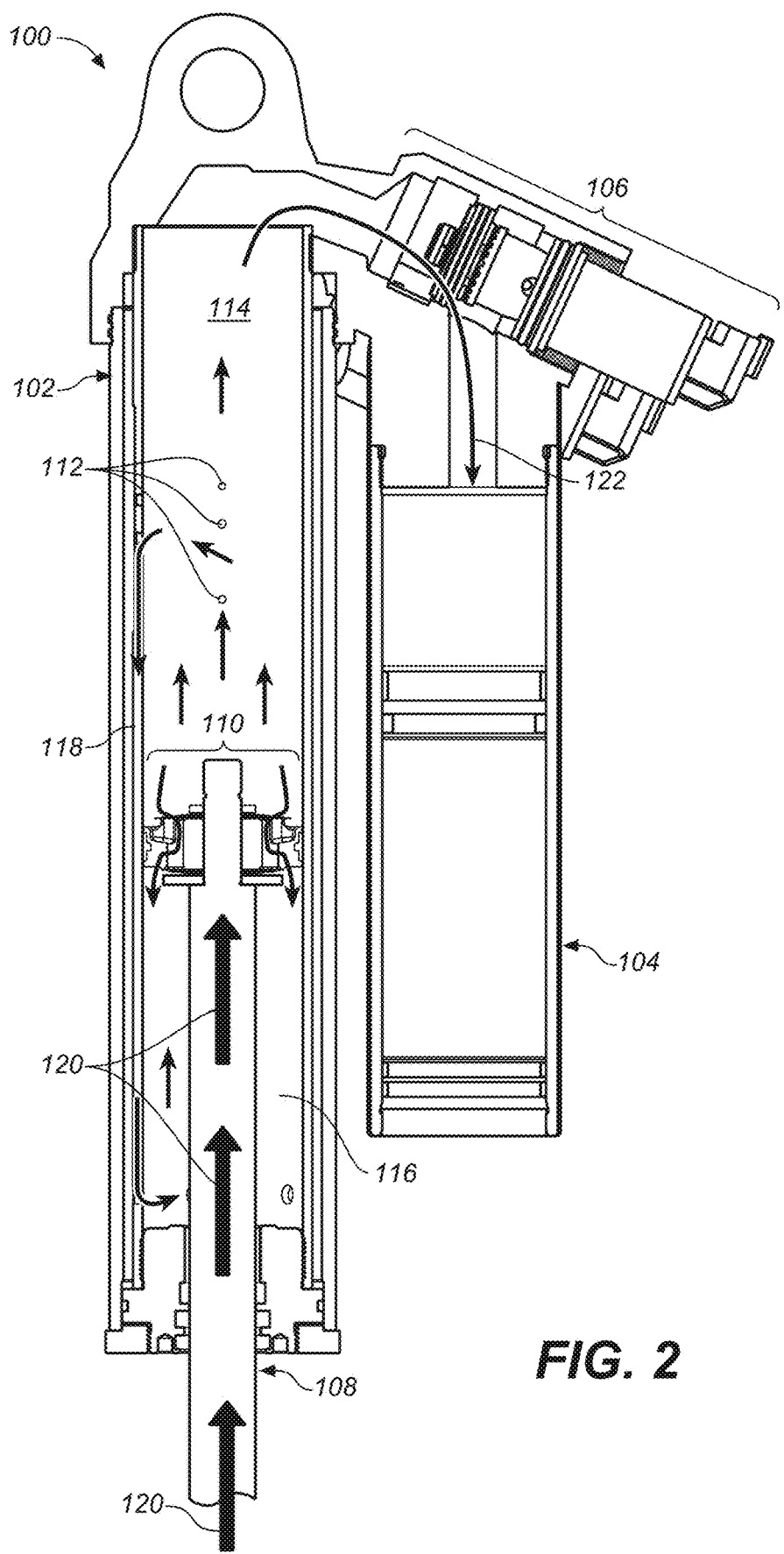
FIG. 2 is a cut-away view of a vehicle suspension damper depicted during compression, in accordance with an embodiment of the present invention.

FIG. 1 is a perspective view of a vehicle suspension damper 100. As shown in FIG. 1, vehicle suspension damper 100 includes a damping cylinder 102 and a reservoir chamber 104 in fluid communication with damping cylinder 102. Vehicle suspension damper 100 also includes an electronic valve assembly 106. FIG. 1 also includes a piston shaft 108 which can move telescopically with respect to damping cylinder 102. Although the present embodiment specifically refers to a twin-tube vehicle suspension damper, embodiments of the present invention are also well-suited to use with other types of vehicle suspension dampers including, but not limited to, a monotube vehicle suspension damper Referring now to FIG. 2, a cut-away view of vehicle suspension damper 100 is shown. As shown in FIG. 2, vehicle suspension damper 100 includes a damping piston 110 coupled to piston shaft 108. Damping cylinder 102 includes an annular chamber 118 which surrounds the interior chamber in which damping piston 110 travels. In the embodiment of FIG. 2, damping cylinder 102 includes bypass openings (typically shown as 112) which fluidically couple the interior of damping cylinder 102 with annular chamber 118. It will be understood that bypass openings 112 in combination with annular chamber 118 are utilized to achieve position dependent damping in vehicle suspension damper 100. Additionally, in some embodiments of the present invention, damping piston 110 will have valving therein to allow fluid to pass through damping piston 110 during compression movement (i.e. motion of piston shaft 108 and damping piston 110 into damping cylinder 102 as shown by arrows 120).

Referring still to FIG. 2, as is typically understood, damping piston 110 at least partially defines a compression region 114 residing above damping piston 110. Similarly, damping piston 110 also at least partially defines a rebound region 116 residing below damping piston 110. It will be understood that the volume of compression region 114 will vary as the position of damping piston 110 changes within damping cylinder 102. Similarly, it will be understood that the volume of rebound region 116 will vary as the position of damping piston 110 changes within damping cylinder 102. Moreover, it will be understood that compression region 114 and/or rebound region 116 may also be defined as including at least a portion of annular chamber 118 depending upon the state (compression or rebound) of vehicle suspension damper 100.

Referring again to FIG. 2, during compression of vehicle suspension damper 100, fluid will typically flow from above damping piston 110 into bypass openings 112, through annular chamber 118 and ultimately into rebound region 116 beneath damping piston 110. Additionally, in some embodiments, during compression, fluid will also pass from compression region 114 to rebound region 116 by passing through valving in damping piston 110. As piston shaft 108 enters damping cylinder 102, fluid is displaced by the additional volume of piston shaft 108 which enters damping cylinder 102. The fluid displaced by piston shaft 108 is referred to as shaft displaced fluid.

Figure 3:
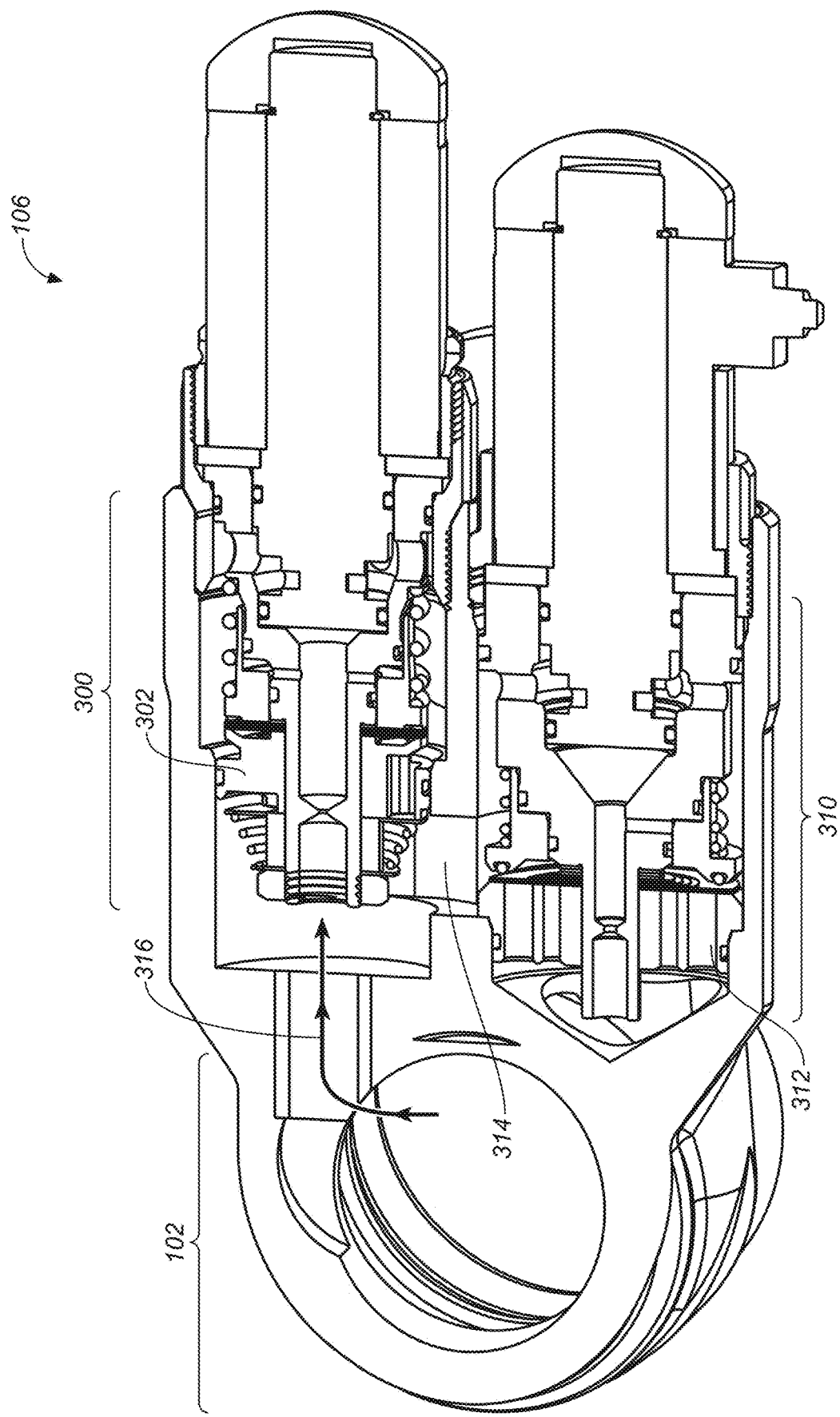
FIG. 3 is a cut-away view of an electronic valve assembly, including a compression fluid flow path, in accordance with an embodiment of the present invention.

Referring now to FIG. 3, a cut-away view of electronic valve assembly 106 is shown including a fluid flow path, shown by arrow 316. Electronic valve assembly 106 includes a first electronic valve 300 and a second electronic valve 310. Among various other components, first electronic valve 300 includes a valve piston 302, and second electronic valve 310 includes a valve piston 312. In one embodiment, valve piston 302 and valve piston 312 are not equally spaced from damping cylinder 102. More specifically, in the present embodiment, the distance of valve piston 302 from damping cylinder 102 is greater than the distance of valve piston 312 from damping cylinder 102. Furthermore, in one embodiment, a channel 314 between first electronic valve 300 and second electronic valve 310 is disposed such that channel 314 is located in front of valve piston 302. That is, channel 314 is closer to damping cylinder 102 than is valve piston 302. Additionally, as shown in FIG. 3, in one embodiment, channel 314 between first electronic valve 300 and second electronic valve 310 is disposed such that channel 314 is located behind valve piston 312. That is, valve piston 312 is closer to damping cylinder 102 than is channel 314.

Referring still to FIG. 3, several significant benefits are realized by the offset orientation of first electronic valve 300 and second electronic valve 310. In the present embodiment, first electronic valve 300 is disposed along a fluid flow path (see arrow 316) extending between compression region 114 (of FIG. 2) of damping cylinder 102 and reservoir chamber 104 (of FIG. 2). During compression, shaft displaced fluid flows from damping cylinder 102 through first electronic valve 300 along a fluid flow path indicated by arrow 316. The shaft displaced fluid flows through valve piston 302 and then (via an opening, not shown) into reservoir chamber 104 (See arrow 122 of FIG. 2). In so doing, in the present embodiment, first electronic valve 300 controls the flow of shaft displaced fluid from compression region 114 of damping cylinder 102 into reservoir chamber 104.

Importantly, it should be noted that in various embodiments of the present invention, first electronic valve 300 is operated independently of second electronic valve 310. Similarly, in various embodiments of the present invention, second electronic valve 310 is operated independently of first electronic valve 300. Thus, in various embodiments, the present invention provides independent control of compression and rebound damping of vehicle suspension damper 100. A further description of various sensors and a control system used in conjunction with first electronic valve 300 to control vehicle suspension damper 100 and adjust a damping force therein is provided below.

With reference now to FIGS. 2 and 3, in the present embodiment, only shaft displaced fluid flows through first electronic valve 300. As a result, first electronic valve 300 can be smaller than a valve which needs to control more fluid than just the shaft displaced fluid. This allows electronic valve assembly 106 to be smaller and less expensive than a valve assembly that is required to control a larger volume of fluid. Further, as first electronic valve 300 operates by controlling a smaller volume of fluid (only the shaft displaced fluid), first electronic valve 300 is able to effectively provide control of compression damping for vehicle suspension damper 100 even during low speed movement of piston shaft 108 and damping piston 110. Additionally, the inclusion of bypass openings 112 and annular chamber 118, along with controlling shaft displaced fluid flow, enables the present embodiment to concurrently achieve position dependent damping and compression damping control even during low speed movement of piston shaft 108 and damping piston 110.

Figure 4:
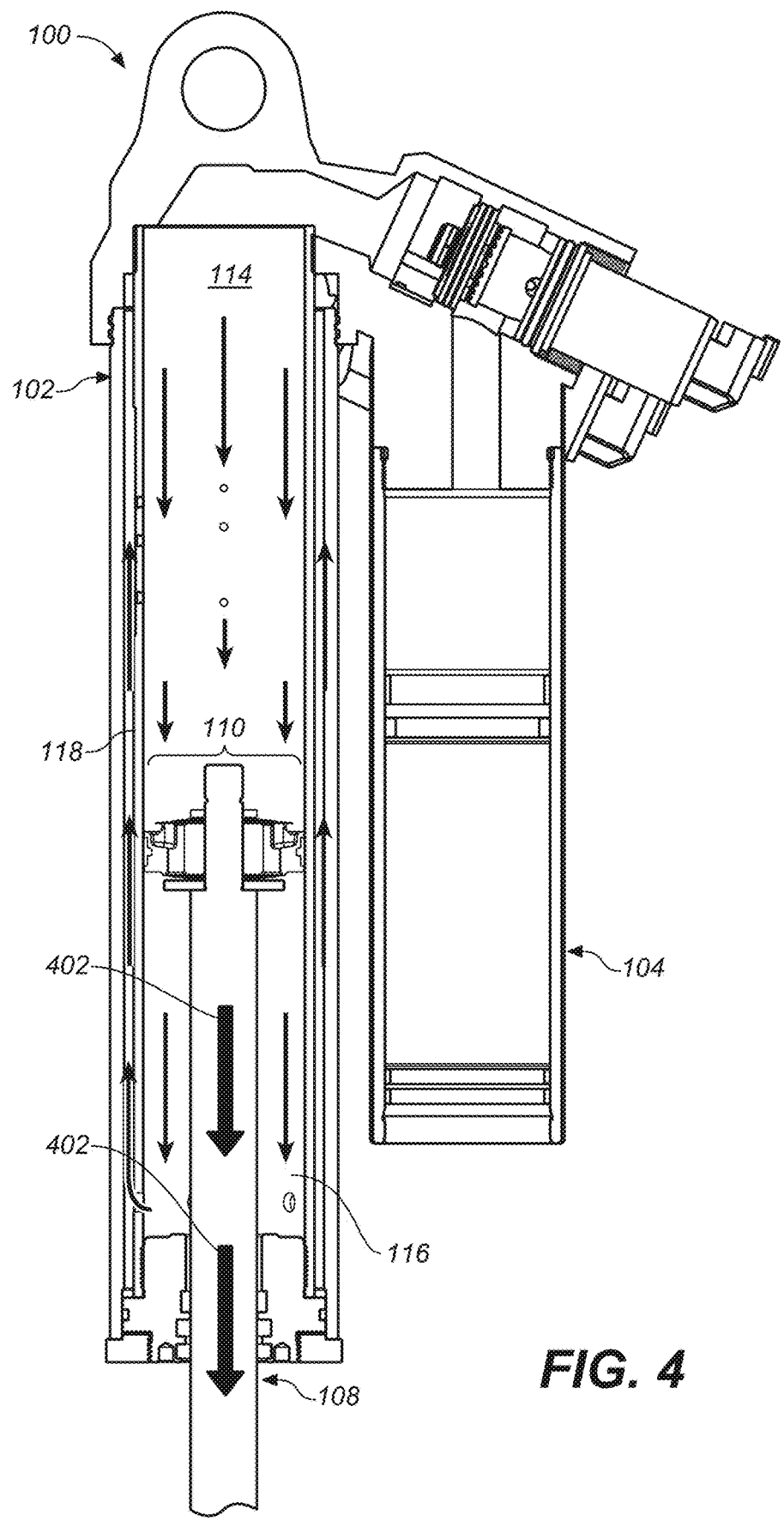
FIG. 4 is a cut-away view of a vehicle suspension damper depicted during compression, in accordance with an embodiment of the present invention.

With reference now to FIG. 4, a cut-away view of vehicle suspension damper 100 is shown. During rebound of vehicle suspension damper 100 (i.e. movement of piston shaft 108 and damping piston 110 out of damping cylinder 102 as shown by arrows 402), fluid will typically flow from below damping piston 110 through annular chamber 118 and ultimately into compression region 114 above damping piston 110. Additionally, in some embodiments, during rebound, fluid will also pass from rebound region 116 to compression region 114 by passing through valving in damping piston 110. In some embodiments, during rebound, fluid is prevented from flowing through damping piston 110 such that all fluid must flow through annular chamber 118 and ultimately into compression region 114 above damping piston 110. In some embodiments of the present invention, bypass openings 112 (of FIG. 2 and not shown in FIG. 4) are closed during rebound such that fluid is prevented from flowing from annular chamber 118 through bypass openings into the region above damping piston 110. Additionally, as piston shaft 108 exits damping cylinder 102, fluid must replace the volume of piston shaft 108 which has exited damping cylinder 102. The fluid which replaces the volume of piston shaft 108 which has exited damping cylinder 102 is typically provided from reservoir chamber 104.

Figure 5:
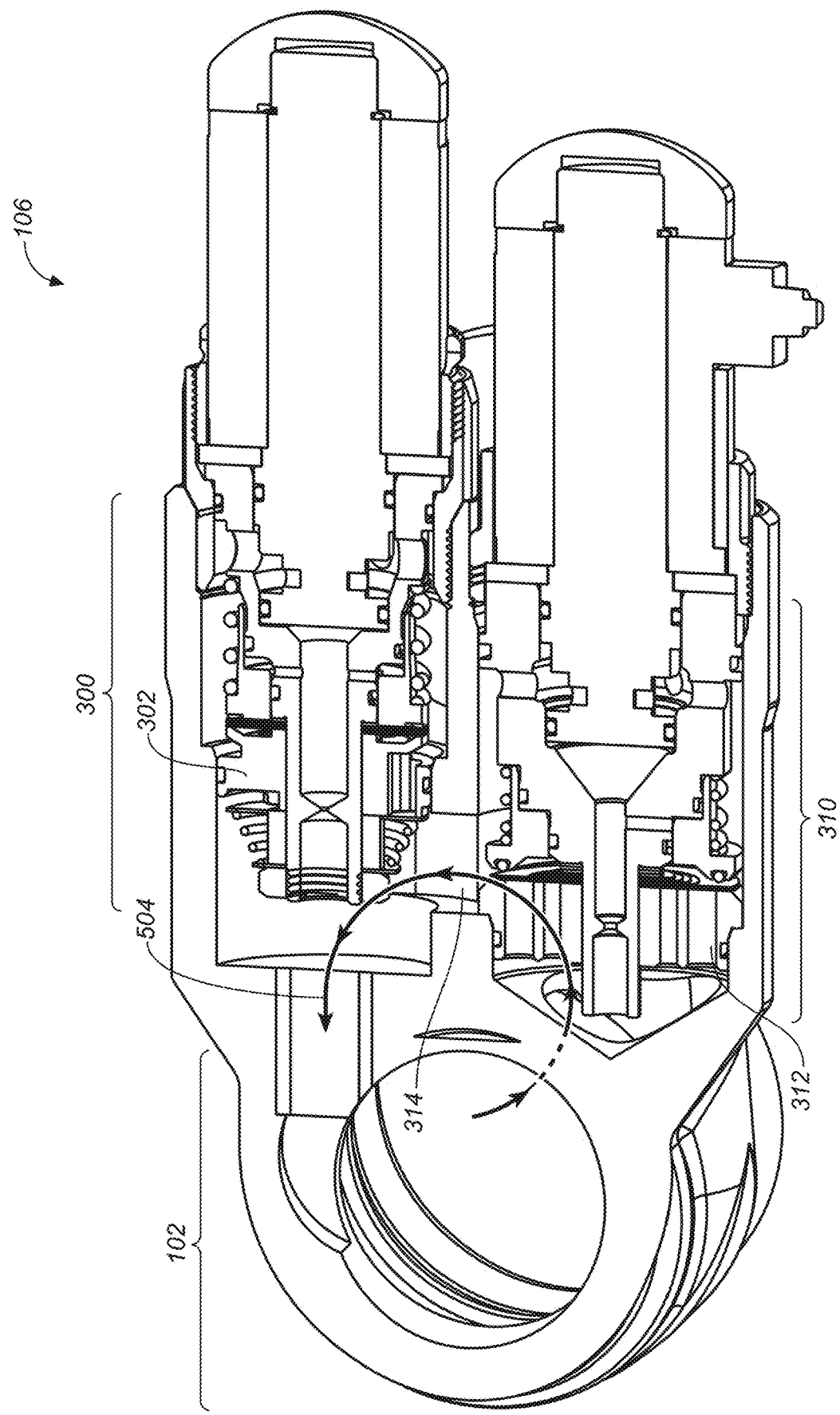
FIG. 5 is a cut-away view of an electronic valve assembly including a rebound fluid flow path, in accordance with an embodiment of the present invention.

Referring now to FIG. 5, a cut-away view of electronic valve assembly 106 is shown including a fluid flow path, shown by arrow 504. As stated above, during rebound, fluid will typically flow from below damping piston 110 through annular chamber 118 and ultimately into compression region 114 above damping piston 110 (all of FIG. 4). As will be described in detail below, in the present embodiment, electronic valve assembly 106 controls the flow of fluid from rebound region 116 (of FIG. 4) and ultimately to compression region 114. As was described in conjunction with FIG. 3, electronic valve assembly 106 includes a first electronic valve 300 and a second electronic valve 310. Among various other components, first electronic valve 300 includes a valve piston 302, and second electronic valve 310 includes a valve piston 312. Again, the structure and operation of electronic valves are described in detail in U.S. Pat. No. 9,452,654 which, as stated above, is incorporated herein by reference in its entirety.

Referring again to FIGS. 4 and 5, in the present embodiment, during rebound, fluid flows from rebound region 116 through annular chamber 118 through opening 502, and through second electronic valve 310. More specifically, in the present embodiment, during rebound, fluid flows from beneath damping piston 110, into annular chamber 118, through opening 502, and through second electronic valve 310. As described below, second electronic valve 310 is configured to control flow of fluid from rebound region 116 of damping cylinder 102 and into compression region 114 of damping cylinder 102. Specifically, during rebound, fluid flows through valve piston 312 of second electronic valve 310, through channel 314 and then into compression region 114 of damping cylinder 102 along a fluid flow path indicated by arrow 504. In one embodiment, during rebound, fluid flows only through second electronic valve 310 (and valve piston 312) and back into compression region 114 of damping cylinder 102. That is, in the present embodiment, rebound fluid does not flow through first electronic valve 300. Thus, in the present embodiment, first electronic valve 300 (including valve piston 302) does not reside in fluid flow path 504 extending from rebound region 116 of damping cylinder 102 into compression region 114.

With reference still to FIG. 5, first electronic valve 300 does not impede the flow of fluid during rebound. Thus, second electronic valve 310 experiences a less pressurized flow of fluid than would be experienced if fluid flow was subsequently impeded, during rebound, by first electronic valve 300. Additionally, as fluid flows rates tend be lower during rebound than compression, second electronic valve 310 can be smaller as it does not typically have handle higher fluid flow rates. As a result, second electronic valve 310 can be smaller than a valve which must control impeded fluid flow or greater fluid flow rates. These factors allow electronic valve assembly 106 to be smaller and less expensive than a valve assembly that is required to handle impeded fluid flow or high fluid flow rates during rebound.

Importantly, it should be noted that in various embodiments of the present invention, second electronic valve 310 is operated independently of first electronic valve 300. Similarly, in various embodiments of the present invention, first electronic valve 300 is operated independently of second electronic valve 310. Thus, in various embodiments, the present invention provides independent control of rebound and compression damping of vehicle suspension damper 100. A further description of various sensors and a control system used in conjunction with second electronic valve 310 to control vehicle suspension damper 100 and adjust a rebound damping force therein is provided below.

Figure 6:
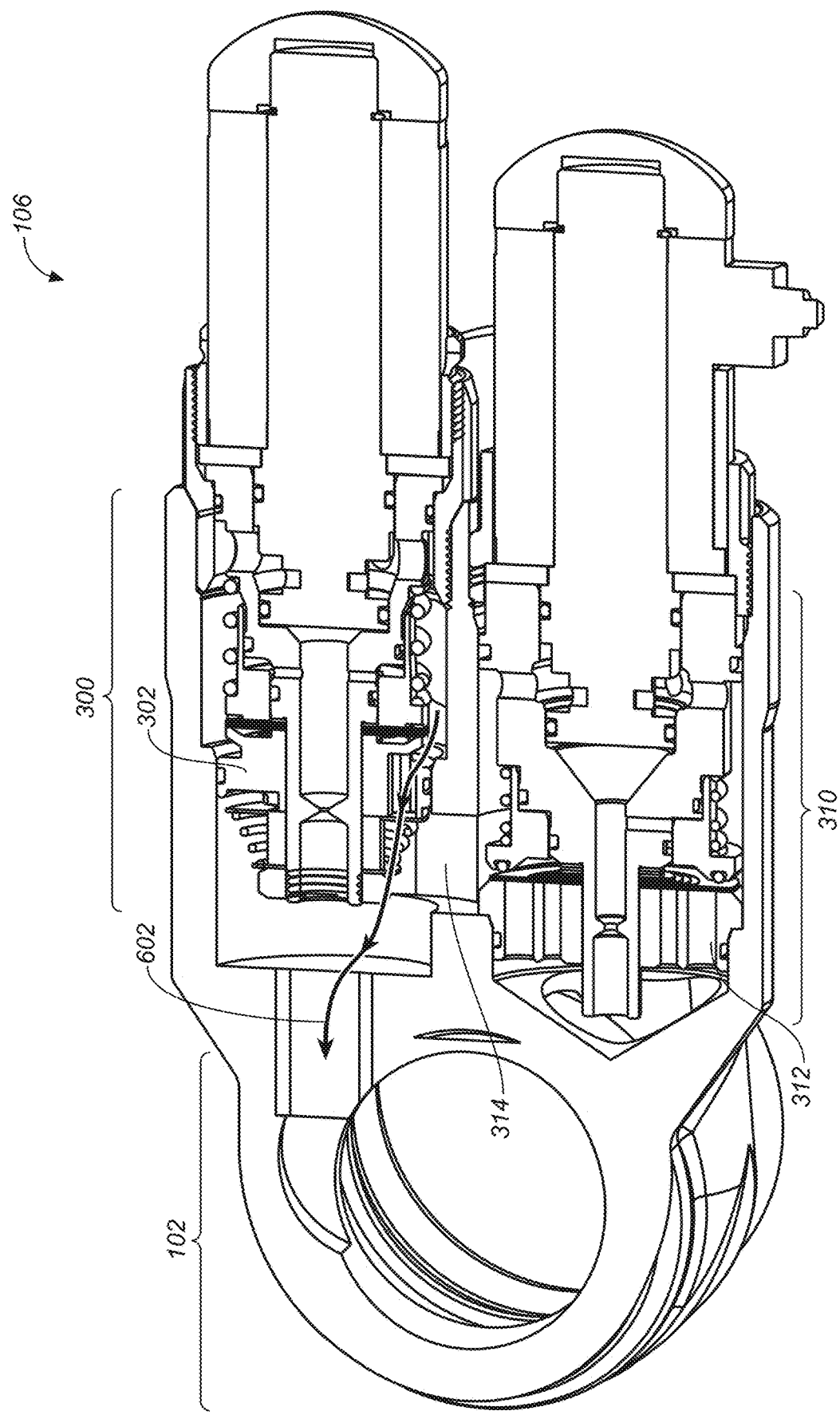
FIG. 6 is a cut-away view of an electronic valve assembly including a fluid flow path from a reservoir chamber back into the damping cylinder, in accordance with an embodiment of the present invention.

With reference now to FIG. 6, a cut-away view of electronic valve assembly 106 is shown including a fluid flow path, shown by arrow 602. As stated above, during rebound, piston shaft 108 exits damping cylinder 102, and fluid must replace the volume of piston shaft 108 which has exited damping cylinder 102 (all of FIG. 4). The fluid which replaces the volume of piston shaft 108 which has exited damping cylinder 102 is typically provided from reservoir chamber 104 (of FIG. 4). In the present embodiment, unlike the teachings of U.S. Pat. No. 9,452,654, during rebound, fluid from reservoir chamber 104 flows only through first electronic valve 300 and back into compression region 114 of damping cylinder 102. More specifically, fluid flows from reservoir chamber 104, through an opening, not shown, through valve piston 302, and back into compression region 114 of damping cylinder 102 along a fluid flow path indicated by arrow 602. Hence, first electronic valve 300 is configured to control flow of fluid from reservoir chamber 104 to compression region 114 of damping cylinder 102. Importantly, in the present embodiment, fluid from reservoir chamber 104 does not flow through second electronic valve 310. Moreover, in the present embodiment, second electronic valve 310 (including valve piston 312) does not reside in fluid flow path 602 extending from reservoir chamber 104 into compression region 114.

As a result of fluid passing only through piston valve 302 and not also through valve piston 312, a greater flow rate and a less pressurized flow of fluid is achieved during rebound for the fluid flow coming from reservoir chamber 104 towards compression region 114. Additionally, as shaft displaced fluid flow rates tend be low, and especially low during rebound, first electronic valve 300 can be smaller as it does not typically have to handle higher fluid flow rates. As a result, first electronic valve 300 can be smaller than a valve which must control impeded fluid flow or greater fluid flow rates. These factors allow electronic valve assembly 106 to be smaller and less expensive than a valve assembly that is required to handle impeded shaft displaced fluid flow or high fluid flow rates during rebound.

As stated above, it should be noted that in various embodiments of the present invention, first electronic valve 300 is operated independently of second electronic valve 310. Thus, in various embodiments, the present invention provides independent control of the flow for the replacement of shaft displaced fluid during rebound damping of vehicle suspension damper 100. A further description of various sensors and a control system used in conjunction with first electronic valve 300 to control the flow for the replacement of shaft displaced fluid and adjust a rebound damping force in vehicle suspension damper 100 is provided below.

Figure 7:
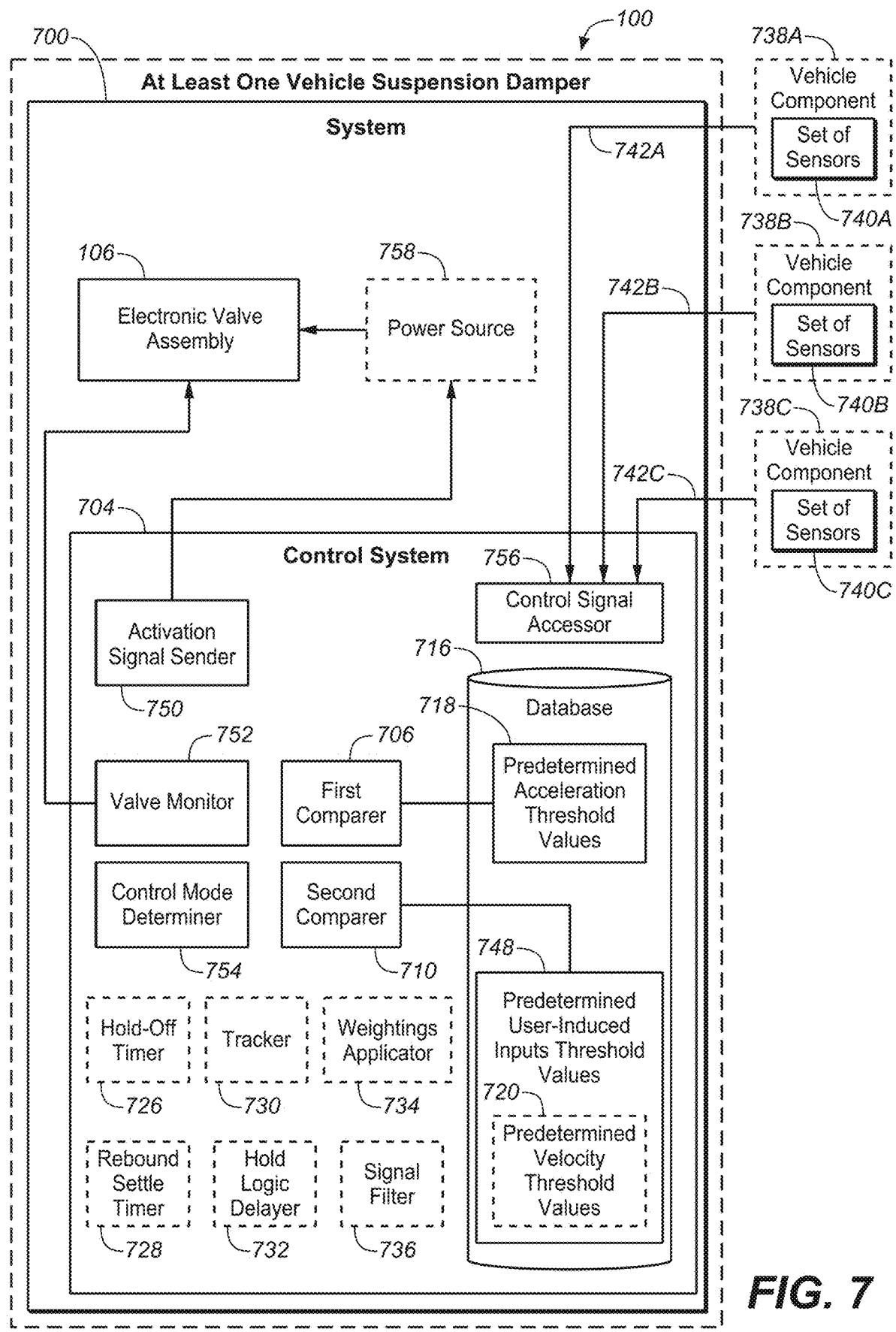
FIG. 7 is a schematic diagram depicting various sensors and a control system used in conjunction with an electronic valve assembly for adjusting a damping force in a vehicle suspension damper, in accordance with an embodiment of the present invention.

With reference now to FIG. 7, a schematic diagram depicting various sensors and a control system used in conjunction with electronic valve assembly 106 for adjusting a damping force in vehicle suspension damper 100 is provided. The structure and operation of the various components of FIG. 7 are described in detail in U.S. Pat. No. 9,452,654 which, as stated above, is incorporated herein by reference in its entirety.

FIG. 7 for controlling vehicle motion is described in relation to controlling the operation of a multi-wheeled vehicle that has more than two wheels, such as, but not limited to, trucks, cars, and more specialized vehicles such as, but not limited to side-by-sides and snowmobiles, in accordance with embodiments. It should be appreciated that while the following discussion focuses on vehicles with four wheels, it should be appreciated that embodiments are not limited to controlling the operation upon vehicles with four wheels. For example, embodiments may be used with vehicles with three wheels, five wheels, six wheels, etc. Four-wheeled vehicles may have four vehicle suspension dampers attached therewith, one vehicle suspension damper attached to each wheel and to the vehicle's frame. In one embodiment, the embodiment depicted in FIG. 7 includes an electronic valve assembly 106 as described above.

Various components of FIG. 7 not only deduce the vertical acceleration values, but also deduce, from a received set of control signals (that include acceleration values associated with various vehicle components), the roll and pitch of a vehicle with more than two wheels. These measured acceleration values relate to the tilt (e.g., roll, pitch) of the vehicle and are compared to a database having thereon preprogrammed acceleration threshold values associated with vehicle components as it relates to tilt. Further, various components of FIG. 7 receive measured velocity values associated with user-induced events (e.g., turning a steering wheel, pressing/releasing a brake pedal, pressing/releasing the gas pedal, thereby causing a throttle to open/close). The control system compares these measured velocity values relating to user-induced events to a database having preprogrammed thereon velocity threshold values associated with vehicle components. Based on the comparison performed with regard to the measured acceleration values with the predetermined acceleration threshold values and the measured velocity values with the predetermined velocity threshold values, as well as the determined state of valves within various vehicle suspension dampers attached to vehicle components, the control system sends an activation signal to power sources of the vehicle suspension dampers. The activation signal activates the power source to deliver a current to one or more of first electronic valve 300 and second electronic valve 310 of electronic valve assembly 106. Once delivered, first electronic valve 300 and second electronic valve 310 of electronic valve assembly 106 adjust to a desired state. The desired state is configured to adjust the damping force to reduce or eliminate the tilt of the vehicle's frame. In other words, the orientation of the vehicle frame is placed as close to level as possible.

As will be described herein, various components of FIG. 7 also provide various system modes within which the vehicle suspension dampers may operate, along with control modes for affecting roll and pitch dynamics of the vehicle. Thus, described first herein are systems and methods for controlling a vehicle's motion by increasing and/or decreasing damping forces within a vehicle suspension damper in quick response to sensed movement of vehicle components (e.g., vehicle wheel base). These systems and methods may be used in various types of multi-wheeled vehicles, such as, but not limited to, side-by-sides (four-wheel drive off-road vehicle), snow mobiles, etc. These systems and methods may be used to control both the front and the rear shock. The systems and methods described herein quickly and selectively apply damping forces through the vehicle suspension dampers (that are coupled with both the vehicle's forks and the vehicle's frame). Such damping enables the vehicle's frame, and thus the vehicle's rider, to experience less acceleration than that being experienced by the wheel base(s).

The system 700 and method, as will be described, detects rolls, pitches, and heaves of four-wheeled vehicles. For example and with regard to detecting rolls, if a car turns a corner sharply left and begins to roll to the right, embodiments sense the velocity of the steering wheel as it is being turned, as well as the translational acceleration associated with the roll experienced by the vehicle. The translational acceleration (distance/time) associated with the roll measures side accelerations. In response to this sensing and in order to control the roll, a control system causes the outer right front and back vehicle suspension dampers to firm up, in some embodiments. Of note, in some embodiments, the vehicle's pitch is measured by sensing the velocity of the throttle pedal as it is being pressed and/or released. In other embodiments, the vehicle's pitch may also be measured by sensing the velocity and/or the position of the throttle pedal as it is being pressed and/or released. In yet other embodiments, the vehicle's pitch is measured by sensing the acceleration of the vehicle. Of further note, the control system does not utilize throttle pedal information to measure roll.

In one embodiment, the system 700 includes electronic valve assembly 106 (that includes first electronic valve 300 and second electronic valve 310) and the control system 704. In one embodiment, the control system 704 includes the following components: a control signal accessor 756; a first comparer 706; a second comparer 710; a valve monitor 752; a control mode determiner 754; and an activation signal sender 750. The second comparer 710 compares the accessed user-induced inputs to predetermined user-induced inputs threshold values 748 found at, in one embodiment, the database 716 (in another embodiment, a database residing external to the control system 704. Further, in various embodiments, the control system 704 optionally includes any of the following: a database 716, a hold-off timer 726; a tracker 730; a hold logic delayer 732; a rebound settle timer 728; a weightings applicator 734; and a signal filter 736. The database 716, according to various embodiments, optionally includes predetermined acceleration threshold values 718 and predetermined user-induced inputs threshold values 748. In various embodiments, the predetermined user-induced inputs threshold values 748 include predetermined velocity threshold values 720. In other embodiments, the predetermined user-induced inputs threshold values include any of the following values: steering velocity threshold value; shock absorber velocity threshold value; brake velocity threshold value; steering position threshold value; throttle position threshold value; shock absorber position threshold value; and brake threshold value.

In one embodiment, the control system 704 may be part of a vehicle suspension damper 100 (that is, for example, on a side-by-side), or it may be wire/wirelessly connected to the control system 704. As will be discussed below, the control system 704 of FIG. 7 is further configured for comparing a set of values associated with at least one user-induced input (such as a user turning a steering wheel and the velocity resulting therefrom) with at least one user-induced input threshold value.

Embodiments of the present invention provide for a control system 704 that accesses a set of control signals 742 (control signal 742A, control signal 742B and control signal 742C; it should be appreciated that there may be any number of control signals, depending on the number of sensors coupled with vehicle components) that includes both acceleration values and a set of values associated with user-induced inputs (such as velocity values [of a steering wheel being turned and/or a throttle pedal being pressed upon and/or released] measured by a set of gyrometers). It should be appreciated that the set of sensors 740A, 740B and 740C (hereinafter, set of sensors 740, unless specifically noted otherwise) attached to the vehicle component 738A, 738B and 738C (hereinafter, vehicle component 738, unless specifically noted otherwise), respectively, may include one or more sensors, such as, but not limited to, accelerometers and gyrometers. In some embodiments, the acceleration values with respect to the four-wheeled vehicles are lateral (side-to-side motion) and longitudinal g's (forward and backwards motion). In other embodiments, the acceleration values with respect to four-wheeled vehicles are lateral g's, longitudinal g's and vertical g's (up and down motion). User-induced inputs, according to embodiments, are those inputs by a user that cause a movement to a vehicle component of the vehicle. For example, user-induced inputs may include, but are not limited to any of the following: turning a steering wheel; pressing a brake pedal (the ON/OFF resultant position of the brake pedal being pressed is measured); and pressing a throttle pedal (a velocity and/or position of the throttle pedal is measured). Thus, a set of values associated with the user-induced inputs may be, but are not limited to being, any of the following user-induced inputs: a measured velocity value of the turning of a steering wheel; a brake's on/off status; velocities associated with pressing down on the brake and/or the throttle pedal; and the difference in the positions of the throttle pedal before and after being pressed (or the absolute throttle position). Of note, the user-induced inputs that are measured are inputs received before acceleration is measured, yet relevant in quickly determining corrective damping forces required to control the roll, pitch and heave once experienced. Thus, the user-induced inputs are precursors to the sensed accelerations of various vehicle components (e.g., vehicle wheels).

Once these values (measured acceleration value and the set of values associated with the user-induced inputs) are accessed by the control signal accessor 756, the first comparer 706 and the second comparer 710 compare these values to threshold values, such as those found in the database 716 (a store of information). Further, according to embodiments, the activation signal sender 750 sends an activation signal to the power source 758 to deliver a current to one or more of first electronic valve 300 and second electronic valve 310 of electronic valve assembly 106, based upon the following: 1) the comparison made between the measured acceleration value and the predetermined acceleration threshold value 718 discussed herein; 2) the comparison made between the measured velocity of the steering wheel as it is being turned (the set of values associated with user-induced inputs) and the predetermined velocity threshold value 720 of the predetermined user-induced inputs threshold values 748; and 3) the monitoring of the state of electronic valve assembly 106.

It should be appreciated that embodiments may include, but are not limited to, other configurations having a control system in wire/wireless communication with the vehicle suspension damper to which it is controlling, such as: 1) a vehicle with only one control system that is wire and/or wirelessly connected to all vehicle suspension dampers attached thereto; 2) a vehicle with one control system attached to one vehicle suspension damper, wherein the one control system controls the other control systems attached to other vehicle suspension dampers (that are attached to different wheels) of the vehicle; and 3) a vehicle with one control system that is not attached to a vehicle suspension damper, wherein the one control system controls other control systems that are attached to vehicle suspension dampers on the vehicle.

Three-Port Adjuster

Figure 8B:
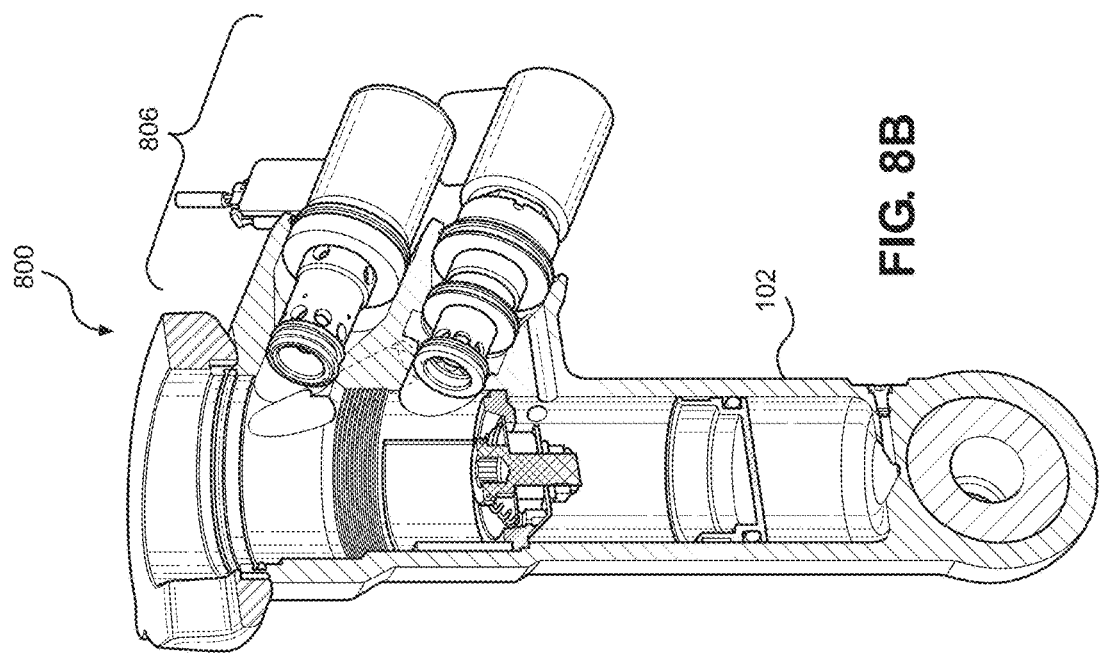
FIG. 8B is a sectional view of another type of vehicle suspension damper with a 3-port adjuster, in accordance with an embodiment.
Figure 8A:
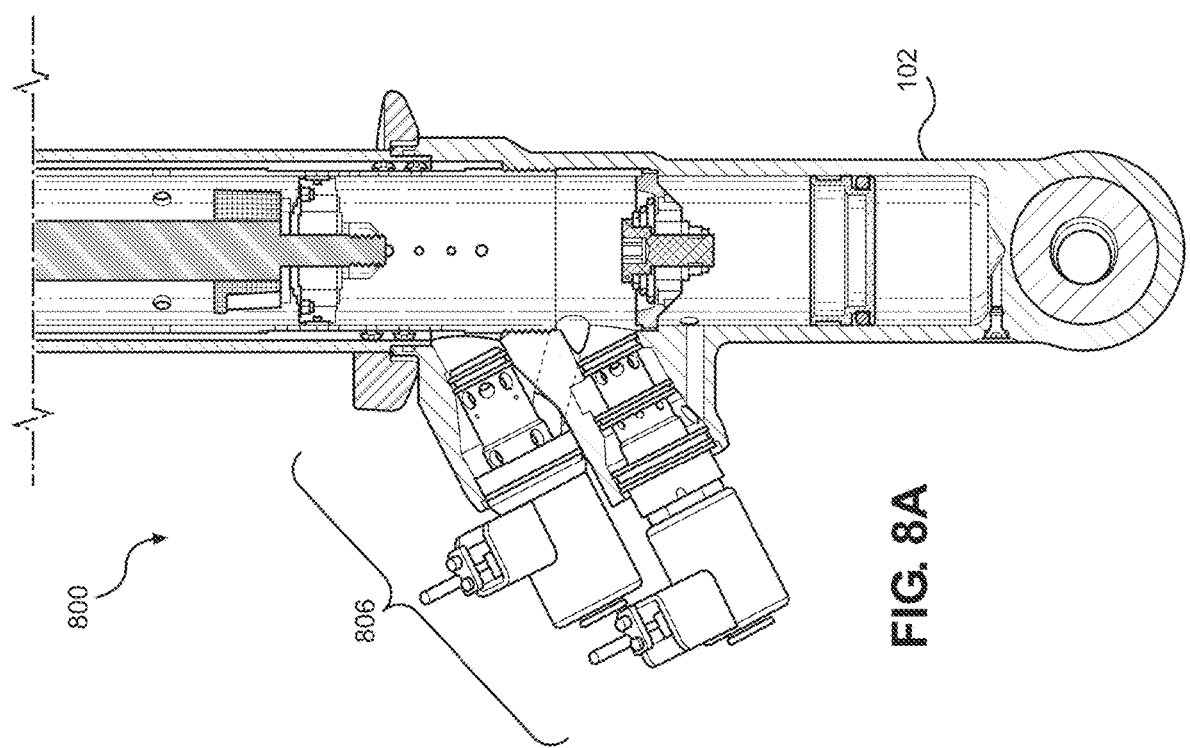
FIG. 8A is a sectional view of a vehicle suspension damper with a 3-port adjuster, in accordance with an embodiment.

FIG. 8A is a sectional view of a vehicle suspension damper 800 with a 3-port (rebound and/or compression) adjuster 806 in accordance with an embodiment. FIG. 8B is a sectional view of another type of vehicle suspension damper 800 with a 3-port adjuster 806 in accordance with an embodiment. In the following discussions, except for the differentiations identified herein, the components of vehicle suspension damper 800 are similar to those of vehicle suspension damper 100, and as such, the discussion of the operation of a vehicle suspension damper 800, other than as affected by the 3-port adjuster 806, is not repeated for purposes of clarity. However, Additional examples, details, and descriptions of a shock absorber/damper can be found in U.S. Pat. No. 10,576,803, the content of which is incorporated by reference herein, in its entirety. Additional examples, details, and descriptions of position-sensitive shock absorber/damper, can be found in U.S. Pat. No. 6,296,092, the content of which is incorporated by reference herein, in its entirety. Additional examples, details, and descriptions of adjustable compression and/or rebound damping, preload, crossover, bottom-out, and the like for a shock absorber/damper can be found in U.S. Pat. No. 10,036,443, the content of which is incorporated by reference herein, in its entirety.

Figure 9:
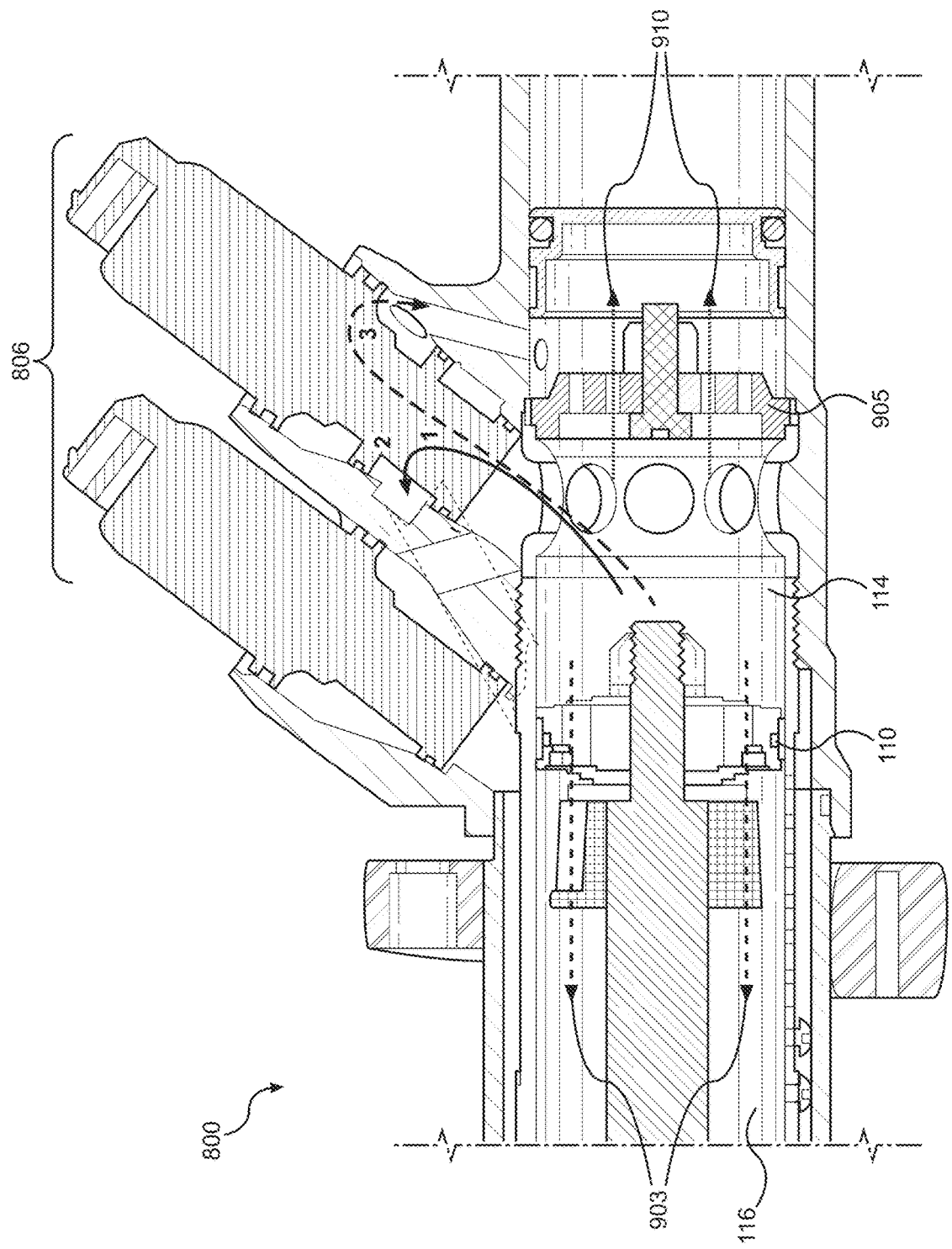
FIG. 9 is a sectional view of a portion of the vehicle suspension damper including the 3-port adjuster, in accordance with an embodiment.

With reference now to FIG. 9, a sectional view of a portion of the vehicle suspension damper 800 including the 3-port adjuster 806 is shown in accordance with an embodiment. In one embodiment, the 3-ports of the 3-port adjuster 806 include a first port that fluidly couples with a compression chamber 114, a second port that fluidly couples with a rebound chamber 116, and a third port that fluidly couples with a reservoir chamber 104 (as shown in FIG. 1). In one embodiment, the third port bypasses both the main piston 110 and the base valve 905. In one embodiment, the 3-port adjuster 806 could be actuated via servo (e.g., active valve), mechanical, hydraulic, pneumatic, or the like.

In one embodiment, the 3-port adjuster 806 is shown with fluid flow during a compression event. In one embodiment, port 1 is connected to the compression chamber 114, port 2 is connected to the rebound chamber 116, and port 3 is connected to reservoir chamber 104.

In one embodiment, during compression of the damper 800, fluid flows through the main piston 110 valving as indicated by arrows 903. In one embodiment, fluid also flow through the base valve 905 valving as indicated by arrows 910. In one embodiment, fluid also flows through the 3-port adjuster 806 indicated by the arrows indicating the flow of the working fluid from the compression chamber to the rebound chamber (e.g., a compression bypass, flowing from port 1 to port 2) and also through the 3-port adjuster 806 indicated by the flow of the working fluid from the compression chamber to the reservoir chamber (e.g., a base valve 905 bypass, flowing from port 1 to port 3). Thus, during compression, in one embodiment, the 3-port adjuster 806 is used to provide a bypass for both the main piston 110 and the base valve 905. In one embodiment, the dual bypass capabilities of the 3-port adjuster 806 allows the damper 800 to maintain pressure balance at different flow settings.

In one embodiment, such as for a larger damper 800, the 3-port adjuster 806 is used as a bypass and a more conventional style of shim stacks are used for one or both the base valve 905 and the main piston 110. In one embodiment, this arrangement will allow the shim stacks to be stiffer than normal, and as such will be used mainly to handle the high-flows from high shock speeds.

In one embodiment, when the 3-port adjuster 806 is used in a smaller damper 800, the shim stacks on one or both the base valve 905 and the main piston 110 could be optionally eliminated and the 3-port adjuster 806 would be used to provide all fluid flow requirements.

Figure 10:
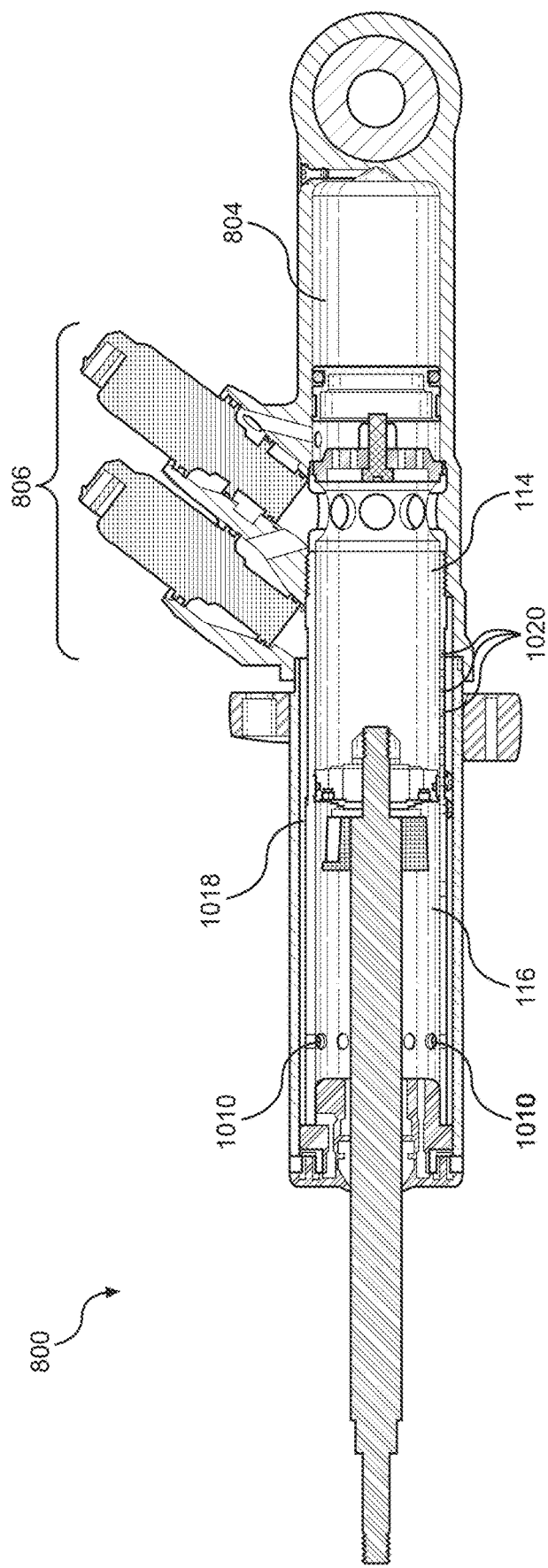
FIG. 10 is a sectional view of the 3-port adjuster in a damper with reflow holes, in accordance with an embodiment.
Figure 21B:
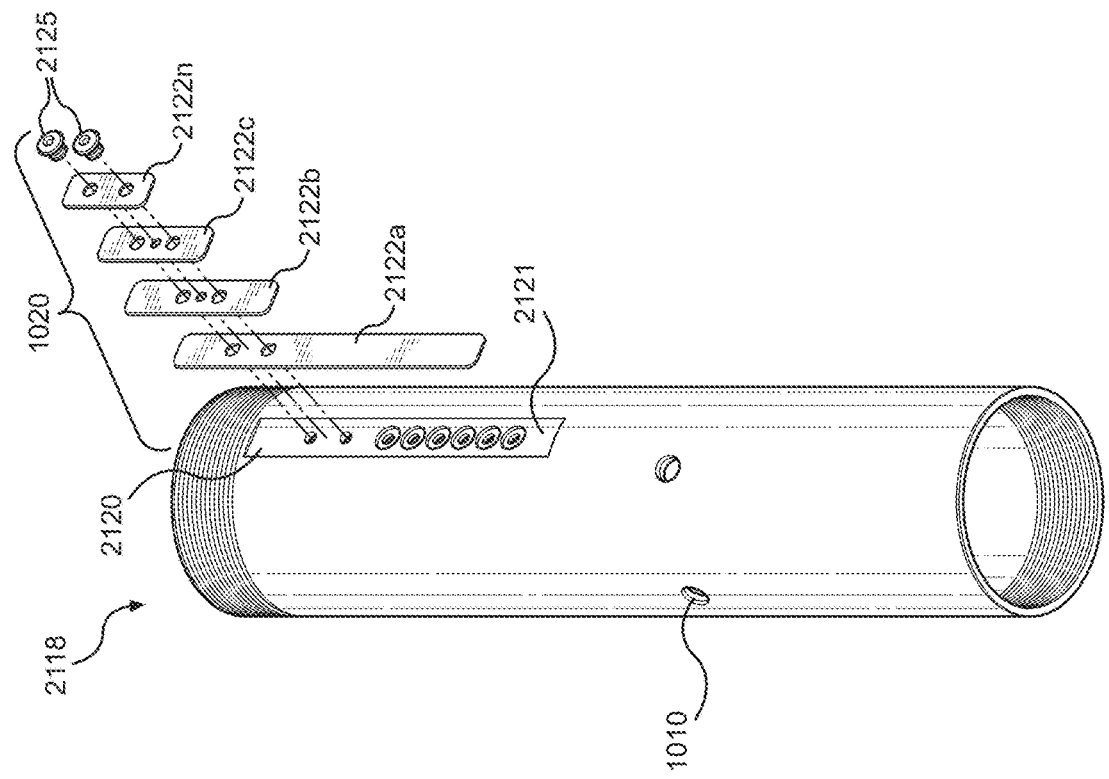
FIG. 21B is an exploded view of the position sensitive element of the internal bypass configuration shown in accordance with an embodiment.
Figure 21A:
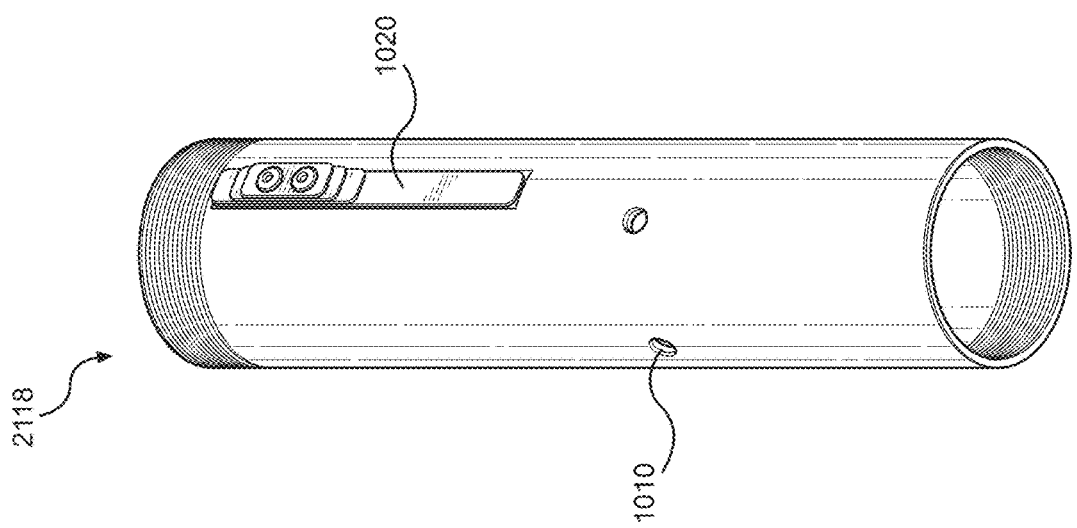
FIG. 21A is a perspective view of an internal bypass configuration shown in accordance with an embodiment.
Figure 21C:
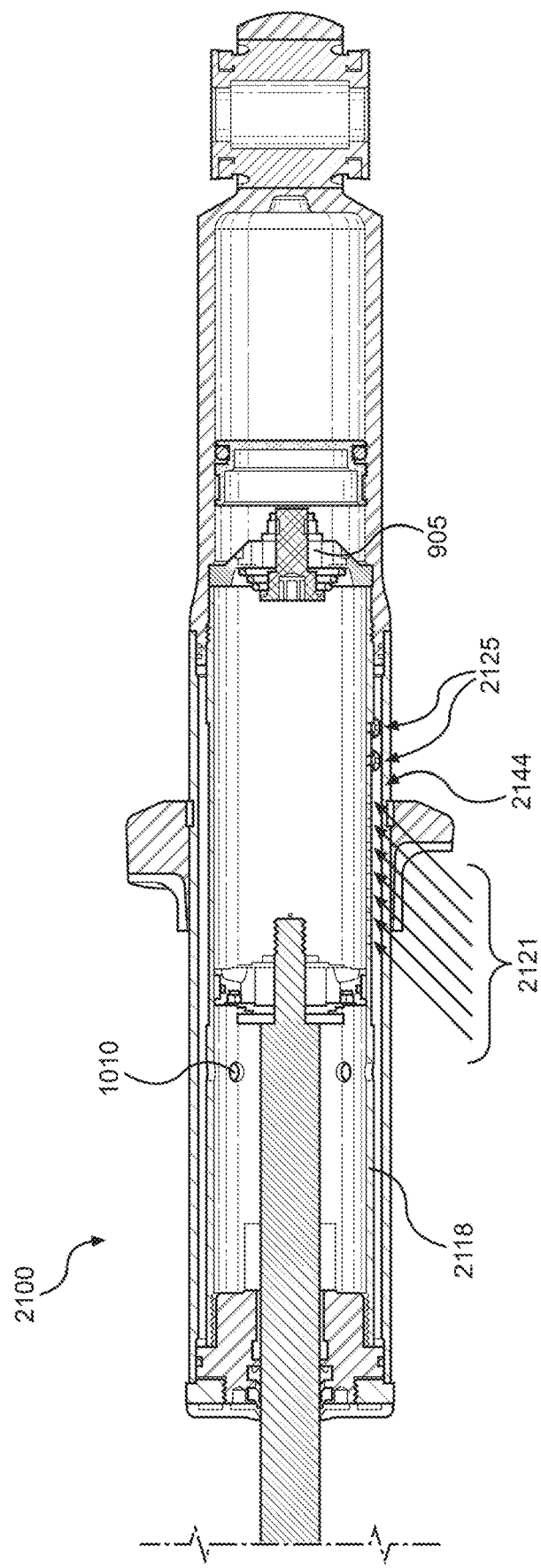
FIG. 21C is a sectional view of the internal bypass of FIGS. 21A and 21B installed in a damper, in accordance with one embodiment

Referring now to FIG. 10, a sectional view of the 3-port adjuster 806 in a damper 800 with reflow holes 1010 is shown in accordance with an embodiment. In one embodiment, the main piston bypass (both compression and rebound) go through the reflow holes 1010. Damper 800 of FIG. 10 also shows an optional position sensitive element 1020 (which is shown in FIGS. 21A-C and described in further detail herein). In general, during rebound, the shims of optional position sensitive element 1020 close up and prevent any fluid flow therethrough. In contrast, during compression, the shims of optional position sensitive element 1020 open and fluid can flow out of the compression chamber 114, through the bypass to the reflow holes 1010, and back into the rebound chamber 116.

Figures 11A, 11B:
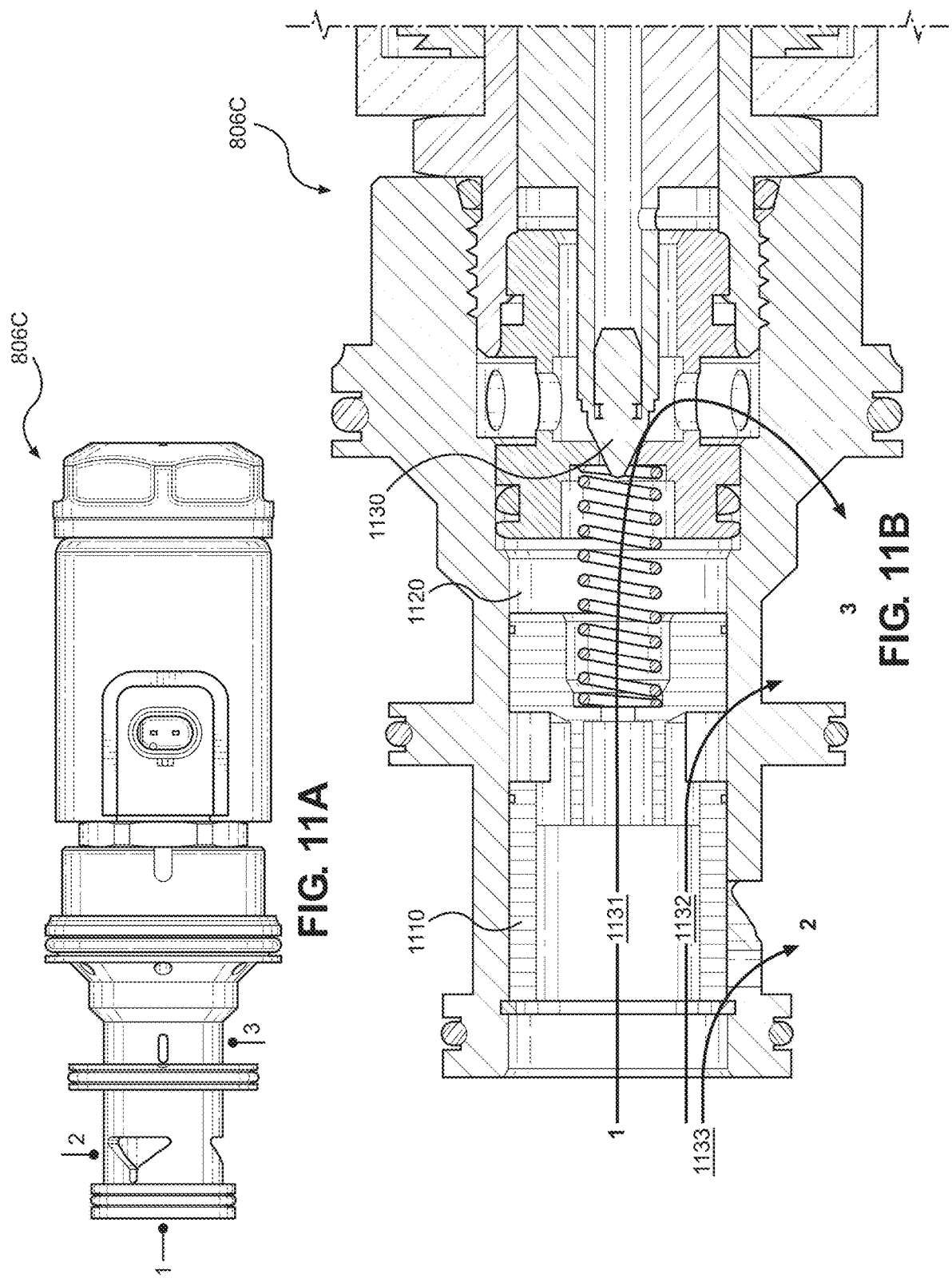
FIG. 11A is a perspective view of the 3-port adjuster, in accordance with an embodiment.
FIG. 11B is a sectional view of a portion of the 3-port adjuster illustrating the compression flow paths, in accordance with one embodiment.

With reference now to FIG. 11A, a perspective view of the 3-port adjuster 806 is shown in accordance with an embodiment. In one embodiment, the 3-port adjuster 806 includes a compression chamber port 1, a rebound chamber port 2, and a reservoir chamber port 3. In one embodiment, the 3-port adjuster 806 valve is a compression only with a pressure-relief 2-stage valve.

Referring now to FIG. 11B, a sectional view of a portion of the 3-port adjuster 806 is shown in accordance with one embodiment. In one embodiment, the 3-port adjuster 806 includes a main stage 1110, a pilot valve 1130, and a pilot chamber 1120. In one embodiment, the pilot valve 1130 is a poppet. In another embodiment, the pilot valve 1130 can be a spool, or other hydraulic adjuster. In one embodiment, the main stage 1110 valve is a spool. In another embodiment, the main stage 1110 valve can be a poppet, or other hydraulic adjuster.

In one embodiment, FIG. 11B includes a number of fluid flow paths including a flow path 1133 for the working fluid from the compression chamber 1 to the rebound chamber 3 (e.g., a compression bypass), a flow path 1132 for the working fluid from the compression chamber 1 to the reservoir chamber 3 (e.g., a base valve 905 bypass), and a pressure relief flow path 1132.

In one embodiment, a majority of the flow through a 2-stage valve is typically handled by the main stage 1110.

With respect to the pilot chamber 1120, in a first order approximation, the pilot valve 1130 controls the pilot pressure. In turn, the pilot pressure controls the main stage 1110 blow-off pressure for a standard hydraulic 2-stage valve. However, a 2-stage valve does not always handle high-frequencies well. For example, the initial opening of the spool may be hydraulicly damped or "hydralocked" by the chamber. In other words, it can be prevented from opening quickly because the volume of the pilot chamber 1120 changes as the main stage 1110 opens. As such, the hydralock can cause an initial overshoot. For example, in a sudden flow increase, a step input in flow, or the like, the main stage 1110 doesn't open fast enough and the pressure builds up.

In one embodiment, to deal with a hydralock situation, at least one position sensitive element 1020 is used with a very light shim stack, so that these elements are basically a compression-only bleed/bypass. In one embodiment, this bypass "masks" the overshoot effect of the hydraulic spool for bypassing the main-piston compression stack. So the valve only has to handle the overshoot from the shaft flow. This shaft flow overshoot is much easier to handle, because it is much smaller (e.g., a small shaft area). In one embodiment, it is small enough for the pilot valve 1130 to handle. That is, the pilot valve 1130 doesn't have as much hydraulic "damping", and is truly open in the full soft/open condition. In the above example, the hydraulic main stage 1110 is referred to as a spool for purposes of clarity. That is, to delineate the hydraulic main stage 1110 from the main piston 110. However, as discussed herein, in another embodiment, the main stage 1110 could be a poppet or other hydraulic element.

FIG. 12A shows a sectional view of the rebound bypass flow path 1210RB of the 3-port adjuster 806 in accordance with an embodiment. In one embodiment, a rebound bypass flow path 1210RB indicates how the working fluid flows from the bypass 1018 through the rebound valve 806R and the compression valve 806C and into the main chamber (e.g., compression chamber 114). In one embodiment, unlike the 2-port valve discussion of FIG. 1-7, in FIG. 12A, the working fluid does flow through both the rebound valve 806R and the compression valve 806C during the rebound stroke. In one embodiment, bypass 1018 is similar to the annular region 118 described herein.

FIG. 12B shows a sectional view of the compression bypass flow path 1210CB of the 3-port adjuster 806 in accordance with an embodiment. In one embodiment, the compression bypass flow path 1210CB indicates how the working fluid flows from the main chamber (e.g., compression chamber 114) through the compression valve 806C and the rebound valve 806R into the bypass 1018. In one embodiment, a base valve bypass flow path 1220 is shown where working fluid flows from the main chamber (e.g., compression chamber 114) through the compression valve 806C and into the base valve bypass chamber 804 (or reservoir 104).

In one embodiment, the 3-port valve configuration of the 3-port adjuster 806 is not directly connected to the rebound chamber 116. Instead, the damper 800 has an additional chamber (e.g., bypass 1018 that is separated from compression chamber 114 and rebound chamber 116 through the valves and check shims similar to the discussion regarding the annular region 118. In one embodiment, the bypass 1018 has a pressure that is the minimum of the compression chamber 114 or rebound chamber 116 (due to the check shims). In one embodiment, the 3-port adjuster 806 might be part of a damper 800 with a simpler body cap (e.g., with less ports, etc.) but has additional elements such as the check shims.

Figure 13:
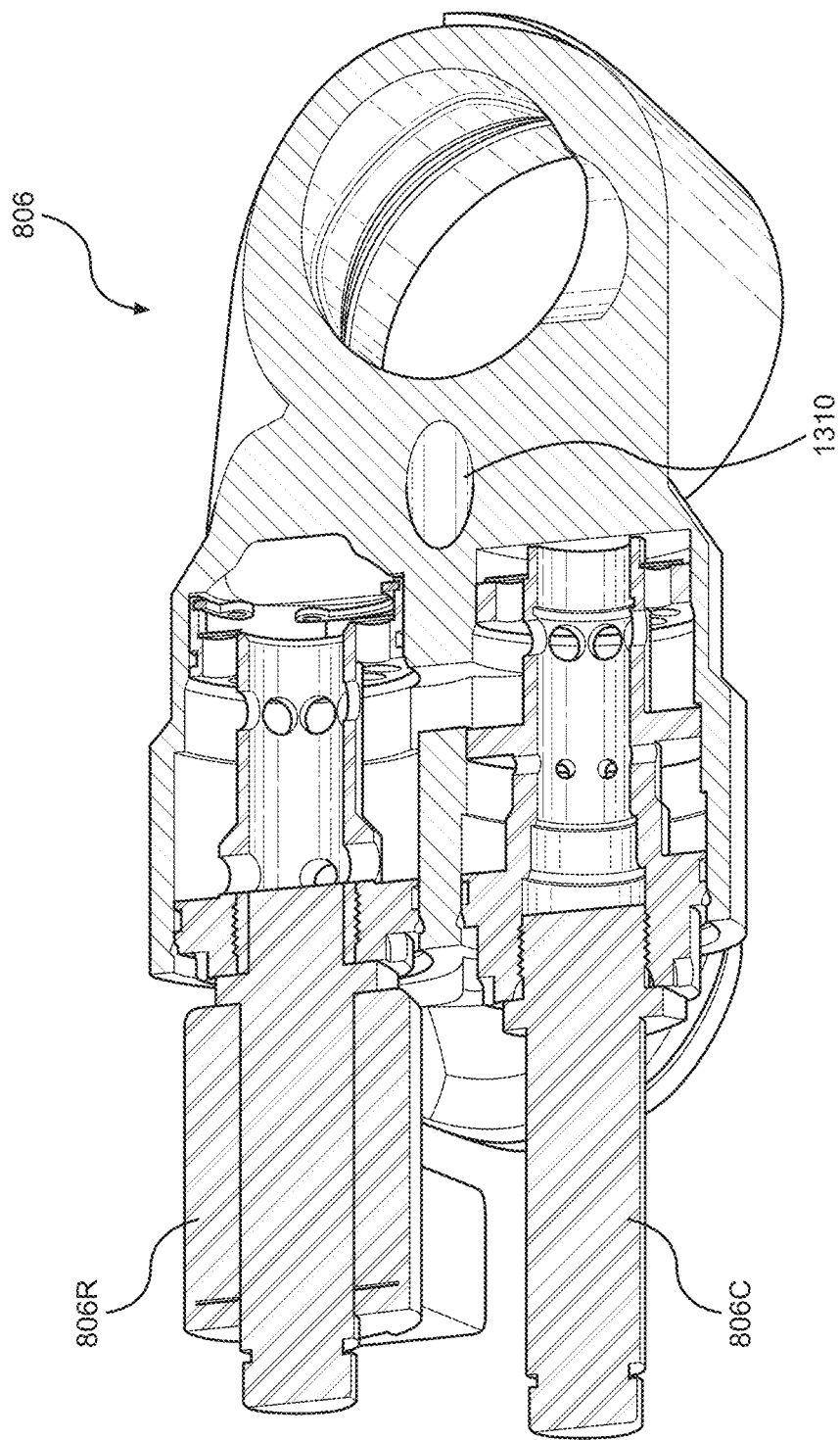
FIG. 13 is a sectional view of a body cap configuration for the 3-port adjuster, in accordance with an embodiment.

Referring now to FIG. 13, a sectional view of a body cap configuration for the 3-port adjuster 806 is shown in accordance with an embodiment. In one embodiment, the hydraulic functionality of the body cap configuration is similar to the functionality previously described herein with respect to FIGS. 2 and 4, and as such, the similarities are not repeated for purposes of clarity. In one embodiment, check valves are provided on the cartridges to simplify the porting. In one embodiment, while a standard power spectral density (PSD) cavity is possible on a 2-port cartridge (rebound), a slightly modified PSD cavity is used on 3-port adjuster 806 embodiments disclosed herein.

For example, the 3-port compression setup for the 3-port adjuster 806 is similar to the 2-stage configuration (described herein with respect to FIGS. 2 and 4). However, in FIG. 13, there is an addition of a third port 1310, e.g., a port from compression valve 806C to passive base valve 905 (at the top of reservoir 104 or base valve bypass chamber 804). In one embodiment, third port 1310 can be added to an existing forging process for the 2-port valve design. For example, in one embodiment of the 2-stage valve disclosed herein, the target is 100 sq mm, with a max 182 sq mm flow area w/ø.625" spool. In one embodiment, the 2-stage 3-port will include an 18 sq mm base valve bypass and a 71 sq mm compression valve bypass.

Figure 14:
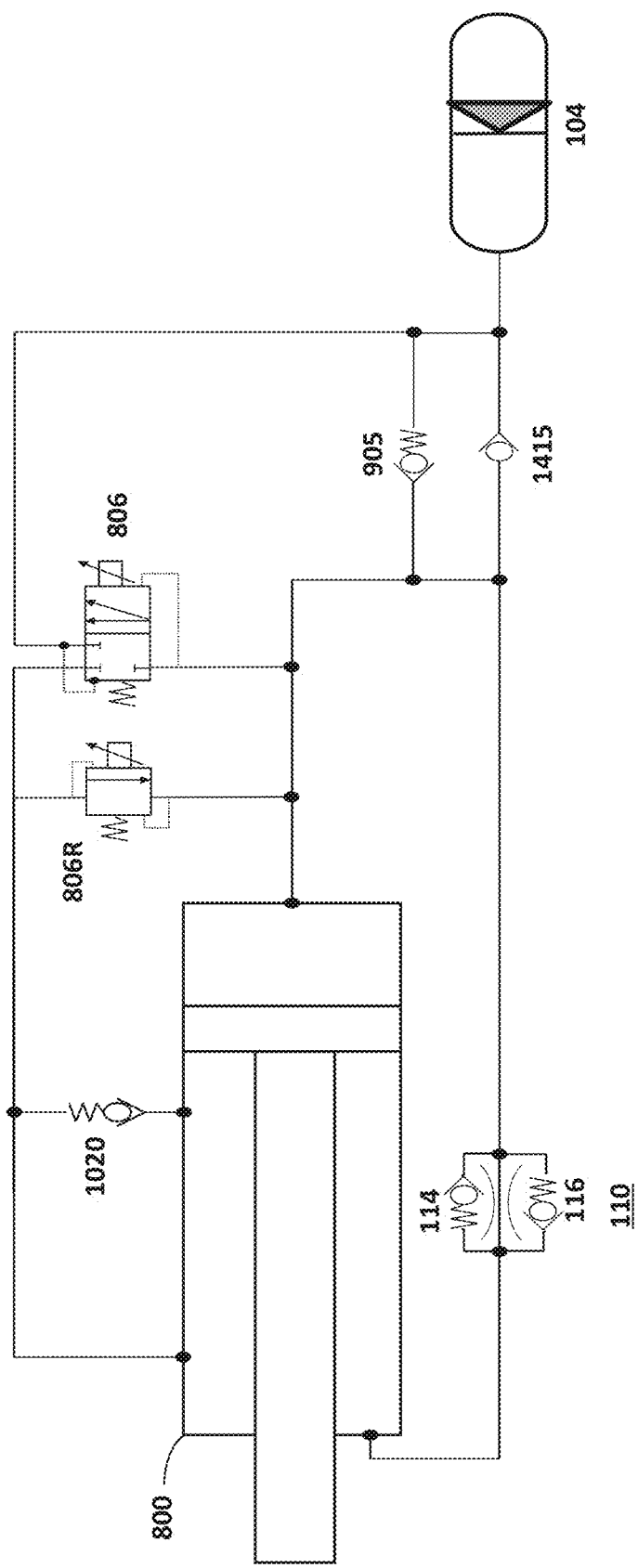
FIG. 14 is a schematic diagram of a 3-port adjuster acting as a semi-active compression valve in a dual valve shock, in accordance with one embodiment.

With reference now to FIG. 14, a schematic diagram of one embodiment of a 3-port adjuster 806 acting as a semi-active compression valve in a dual valve damper 800 is shown in accordance with one embodiment. In one embodiment, there are position-sensitive bypass valves 1020 that are active only in the ride zone 2193 (of FIG. 21D). In one embodiment, the schematic diagram shows a base valve 905, a reservoir 104, a check valve 1415, and a compression side 114 and rebound side 116 in the main chamber which are divided by the main piston 110. In one embodiment, an optional rebound valve 806R is shown as a direct acting valve.

In one embodiment, the 3-port adjuster 806 schematic shows a compression configuration, with the rebound valve 806R as a direct acting valve. In an active and/or semi-active valve arrangement, a relatively small solenoid (using relatively low amounts of power) can generate relatively large damping forces. Furthermore, due to incompressible fluid inside the damping assembly, damping occurs as the distance between the cone shaped member and the orifice is reduced. The result is a controllable damping rate. Additional active and semi-active valve features and examples are described and shown in U.S. Pat. Nos. 8,627,932; 8,857,580; 9,033,122; 9,120,362; and 9,239,090 the contents of which are incorporated by reference herein, in their entirety.

Additional information for vehicle suspension systems, sensors, and their components as well as adjustment, modification, and/or replacement aspects including manually, semi-actively, semi-actively, and/or actively controlled aspects and wired or wireless control thereof is provided in U.S. Pat. Nos. 8,838,335; 9,353,818; 9,682,604; 9,797,467; 10,036,443; 10,415,662; the content of which are incorporated by reference herein, in their entirety.

Figure 15A:
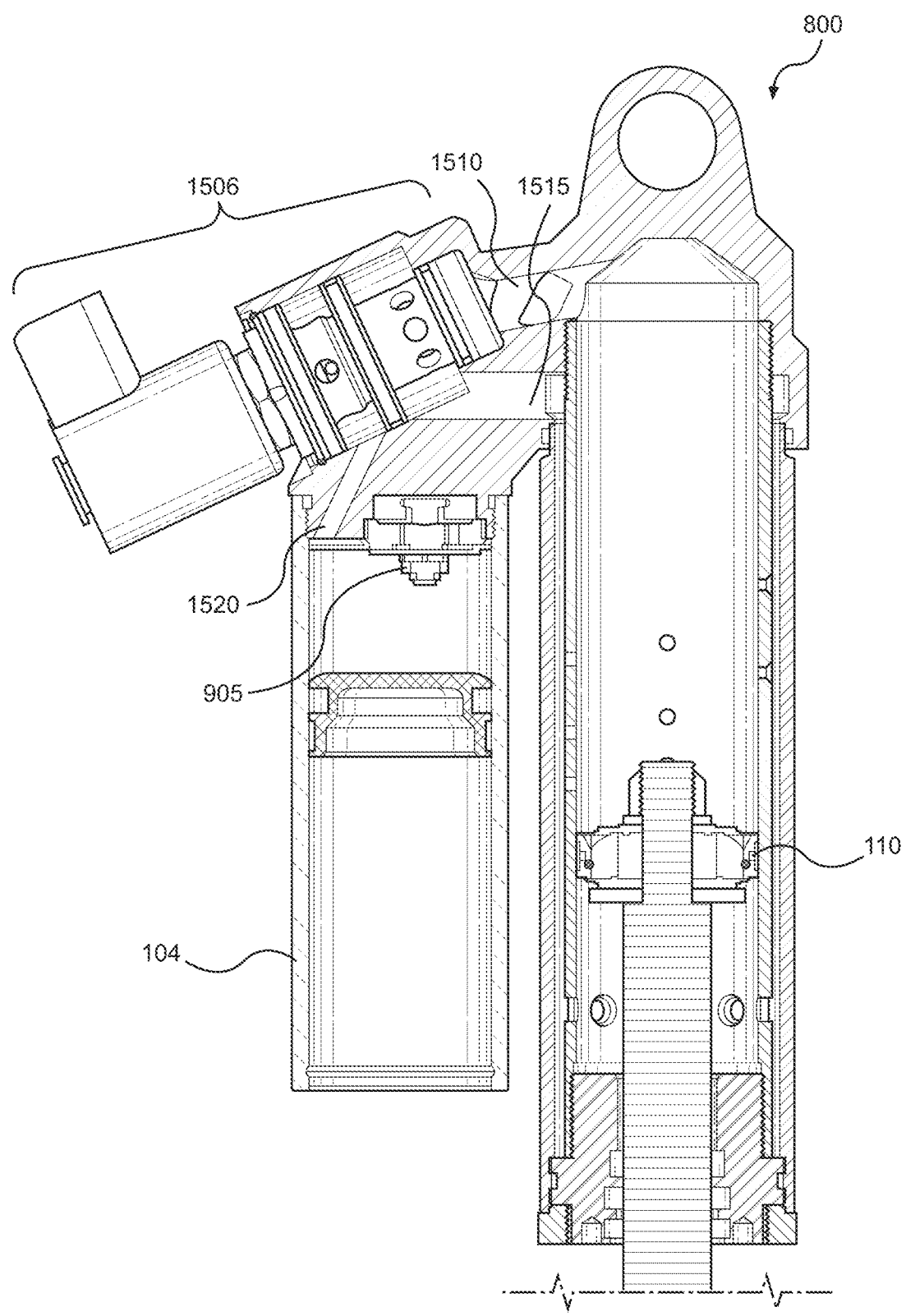
FIG. 15A is a sectional view of a single valve 3-port adjuster configuration in a damper, in accordance with one embodiment.

FIG. 15A is a sectional view of a single valve 3-port adjuster 1506 configuration in damper 800 is shown in accordance with one embodiment. In one embodiment, damper 800 includes a main chamber with a main piston 110, a single valve 3-port adjuster 1506, and a reservoir 104. In one embodiment, single valve 3-port adjuster 1506 includes valving and a compression port 1510, a rebound port 1515, and a reservoir port 1520.

In one embodiment, the single valve 3-port adjuster 1506 includes an active or semi-active valve. In one embodiment, a single valve 3-port adjuster 1506 includes valves such as, but not limited to, mechanical, electro-hydraulic, pneumatic, or the like. In one embodiment, the single valve 3-port adjuster 1506 is used to control compression, rebound, and/or base valve 905 bypass. In one embodiment, the single valve 3-port adjuster 1506 of FIG. 15A may be used in any of the different shock variations such as, but not limited to those shown in FIGS. 1, 8A, and 8B.

In one embodiment, the single valve 3-port adjuster 1506 is coupled with the compression, rebound, and reservoir chambers and provides adjustability by adjusting one or more of the flows therebetween. In one embodiment, the single valve 3-port adjuster 1506 can replace a body cap adjusters that act as a base valve 905. For example, in a body cap adjuster that is acting as a base valve 905, adjusting the body cap adjuster to adjust the base valve 905 force will normally only provide a compression force adjustment. Moreover, that compression force adjustment may not always be pressure balanced. However, by replacing the body cap adjuster acting as a base valve 905 with the single valve 3-port adjuster 1506, an additional valve that connects the compression and rebound chambers is added. Moreover, the single valve 3-port adjuster 1506 advantages include the ability to adjust compression in a more pressure balanced way, such as, for example, to adjust compression with base valve only and rebound.

In one embodiment, the single valve 3-port adjuster 1506 may entirely replace compression and/or rebound shim stacks on main piston 110 and/or base valve stacks on base valve 905. For example, instead of the base valve 905, the single valve 3-port adjuster 1506 could handle all flow into the reservoir chamber of reservoir 104, especially at smaller shaft sizes or lower speed applications. In one embodiment, this would be potentially digressive for more low speed control range.

In one embodiment, the main piston 110 will have compression and rebound stacks. In one embodiment, the main piston 110 will optionally have compression and rebound stacks. In one embodiment, the main piston 110 will optionally have only one of compression stacks or rebound stacks. In one embodiment, the main piston 110 will not have any compression stacks or any rebound stacks. In one embodiment, the main piston 110 will be potentially digressive for additional low speed control range.

Frequency Dependent 2-Stage Single Adjuster

FIG. 15B shows a cross-sectional view of a frequency dependent 2-stage single valve 3-port adjuster 1506 in accordance with an embodiment. In one embodiment, the frequency dependent 2-stage single valve 3-port adjuster 1506 includes a semi-active valve. In one embodiment, frequency dependent 2-stage single valve 3-port adjuster 1506 includes a manual valve. In one embodiment, frequency dependent 2-stage single valve 3-port adjuster 1506 has a compression chamber port, a rebound chamber port, and a reservoir chamber port as shown in FIG. 11A.

In one embodiment, frequency dependent 2-stage single valve 3-port adjuster 1506 includes a pilot inlet 1535 and a pilot valve orifice 1540. In one embodiment, the frequency dependent 2-stage single valve 3-port adjuster 1506 has a pilot inlet 1535 (or inlets) that is larger than the pilot valve orifice 1540 (or orifices). By using a (e.g., non-standard or oversized) pilot inlet 1535 that is larger than the pilot valve orifice 1540, the pilot chamber 1120 will feedback on itself. If the pilot inlet 1535 is large enough, it hydralocks.

As described herein, hydralock occurs when the flow through the pilot circuit overwhelms the pilot valve 1130 (shown in FIG. 11B), causing the pilot chamber 1120 pressure to build up, which in turn causes the pilot inlet 1535 pressure to go up, which causes the pilot chamber 1120 pressure to build up, etc. This feedback loop causes the pilot chamber 1120 pressure to build up slowly, effectively turning the 2-stage single valve 3-port adjuster 1506 into a low pass filter. Thus, the frequency dependent 2-stage single valve 3-port adjuster 1506 can be used in a bypass configuration and during an occurrence of hydralocking, the bypass would be lost but the damper would otherwise operate normally. Moreover, the position sensitive element 1020 can handle both the high-flows as well as any hydralocking issues. In one embodiment, the pilot stage does not need to be a pressure relief valve.

In one embodiment, the unusually large inlet orifice is used to cause the spool to hydralock. However, since it takes time for the pilot chamber pressure to build up, the frequency dependent 2-stage single valve 3-port adjuster 1506 is softer at high frequencies than at lower frequencies.

In one embodiment, if the pilot inlet 1535 is not as large as the pilot valve orifice 1540, there are still some beneficial frequency dependent effects. However, in one embodiment, those beneficial frequency dependent effects are not as large as the beneficial frequency dependent effects found in the frequency dependent 2-stage single valve 3-port adjuster 1506 having pilot inlets that are larger than the pilot valve orifices.

In one embodiment, the frequency dependent 2-stage single valve 3-port adjuster 1506 improves ride quality thru frequency dependent damping. For example, wheel shake frequencies are typically around 10 hz while a vehicles natural frequencies are typically in the 20-30 hz region (frame modes, body mounts, bushings, etc.). The frequency dependent 2-stage single valve 3-port adjuster 1506 is used to provide damping for one or more of those frequencies.

In FIG. 15C, a frequency dependent 2-stage single valve 2-port adjuster 1566 is shown in accordance with an embodiment. In one embodiment, although it is only a 2-port adjuster, in one embodiment, the frequency dependent 2-stage single valve 2-port adjuster 1566 can also benefit from a pilot inlet 1575 (or inlets) that is larger than the pilot valve orifice 1580 (or orifices). Similar to the discussion of FIG. 15B, by using a (e.g., non-standard or oversized) pilot inlet 1575 that is larger than the pilot valve orifice 1580, the pilot chamber 1120 of frequency dependent 2-stage single valve 2-port adjuster 1566 will feedback on itself providing similar performance to that of the frequency dependent 2-stage single valve 3-port adjuster 1506.

Figure 16:
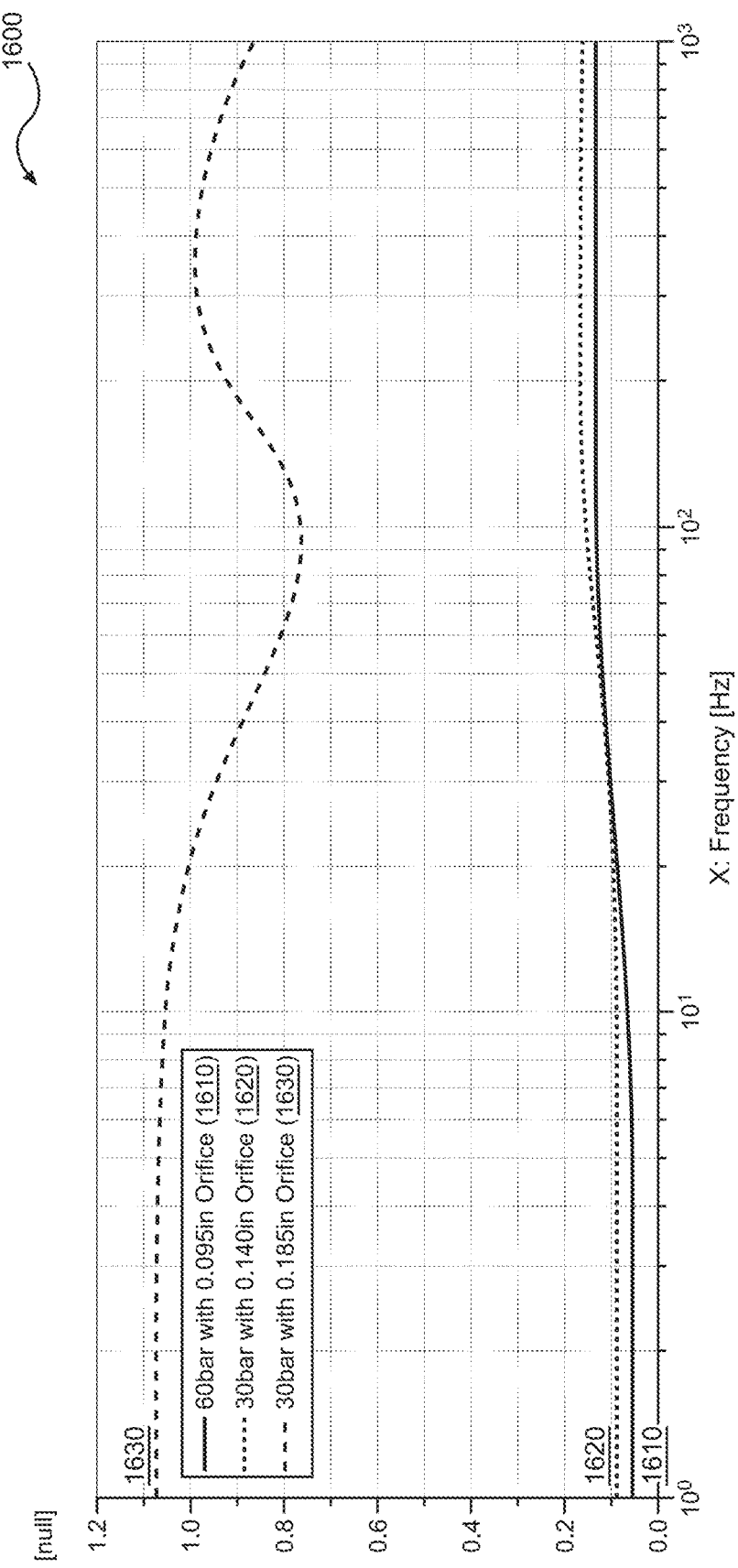
FIG. 16 is a graph of frequency attributes of a frequency dependent 2-stage single valve 3-port adjuster, in accordance with an embodiment.

FIG. 16 a graph 1600 of different frequency attributes of a frequency dependent 2-stage single valve 3-port adjuster in accordance with an embodiment. In one embodiment, the graph includes the results when using the frequency dependent 2-stage single valve 3-port adjuster 1506 affecting the wheel shake and vehicle natural frequencies. In general graph 1600 includes line 1610 which represents a frequency dependent 2-stage single valve 3-port adjuster 1506 set to 60 bar with 0.095 inch orifice. Line 1620 represents frequency dependent 2-stage single valve 3-port adjuster 1506 set to 30 bar with 0.140 inch orifice. Line 1630 represents one embodiment used for frequency dependent 2-stage single valve 3-port adjuster 1506 which provides good results when set to 30 bar with 0.185 inch orifice. As shown in graph 1600, the frequency dependent 2-stage single valve 3-port adjuster 1506 set at line 1630 provides a relatively flat damping force response out to 10 hz to control wheel shake and a drop in frequency response after that.

In one embodiment, as shown in graph 1600, the vehicle also has resonances at approximately 22 and 28 hz which is likely a frame or body mount natural frequency. In one embodiment, using the frequency dependent 2-stage single valve 3-port adjuster 1506 set to 30 bar with 0.185 inch orifice reduces response at those additional frequencies which will further reduce ride harshness. Similarly, using the frequency dependent 2-stage single valve 3-port adjuster 1506 set to 30 bar with 0.185 inch orifice, the high response at 1-10 hz helps control the body and wheel vibration, respectively. Although one embodiment, discloses the frequency dependent 2-stage single valve 3-port adjuster 1506 set to 30 bar with 0.185 inch orifice, it is understood that in another embodiment, different pressures and or orifice sizes may be used to provide different results for different vehicles, suspension setups, environments, terrain, vehicle type, vehicle use (e.g., high speed, racetrack, rough terrain, normal speed, low speed rock crawling, etc.).

Figure 17:
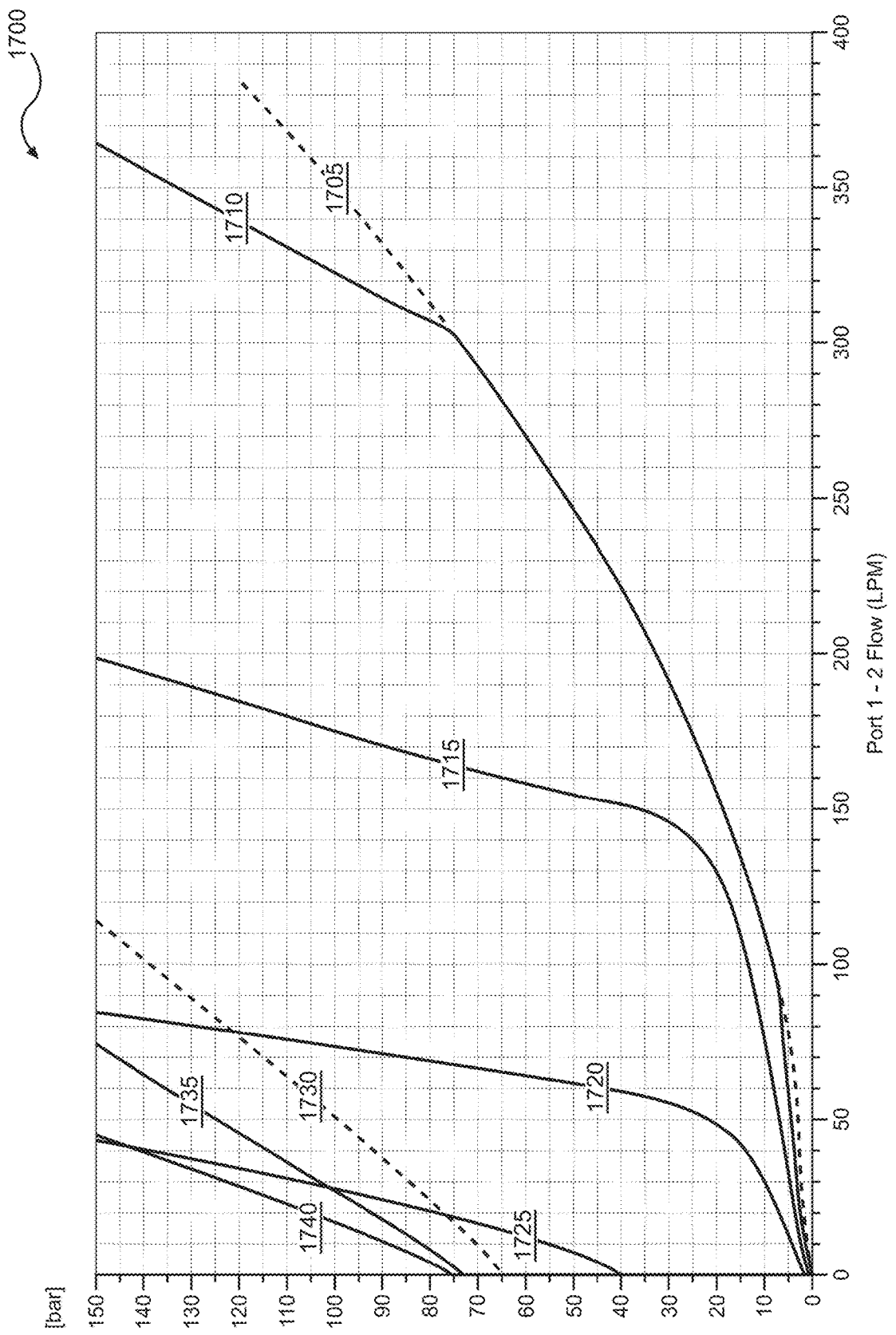
FIG. 17 is a graph of port 1-2 flow (LPM) vs. pressure (bar) for a frequency dependent 2-stage single valve 3-port adjuster, in accordance with an embodiment.

Referring now to FIG. 17, a graph 1700 of port 1-2 flow (LPM) vs. pressure (bar) for a frequency dependent 2-stage single valve 3-port adjuster is shown in accordance with an embodiment. In one embodiment, graph 1700 includes 8 graph lines with pressure in bar and inlet orifice size in inches. The lines include, line 1705—a 1.6 A reference line 60 bar with a 0.095 inlet orifice; line 1710—a 1.6 A 30 bar with a 0.136 inlet orifice; line 1715—a 1.6 A 30 bar seat with a 60 bar spring and a 0.155 inlet orifice; line 1720—a 1.6 A 30 bar with a 0.185 inlet orifice; line 1725—a 0 A 30 bar with a 0.185 inlet orifice; line 1730—a 0 A reference line 60 bar with a 0.095 inlet orifice; line 1735—a 0 A 30 bar with a 0.136 inlet orifice; and line 1740—a 0 A 30 bar seat with a 60 bar spring and a 0.155 inlet orifice.

In one embodiment, the frequency dependent 2-stage single valve 3-port adjuster 1506 is a 30 bar with a 0.185 inlet orifice with a performance shown in lines 4 and 5 on graph 1700. In one embodiment, using the larger orifices make the spool "hydralock". In so doing, the hydralocked spool does not move as far as it normally would, thus restricting flow. As stated herein, the hydralock takes time to resolve, and during that resolution time, the force is significantly reduced at higher frequencies.

Figure 18:
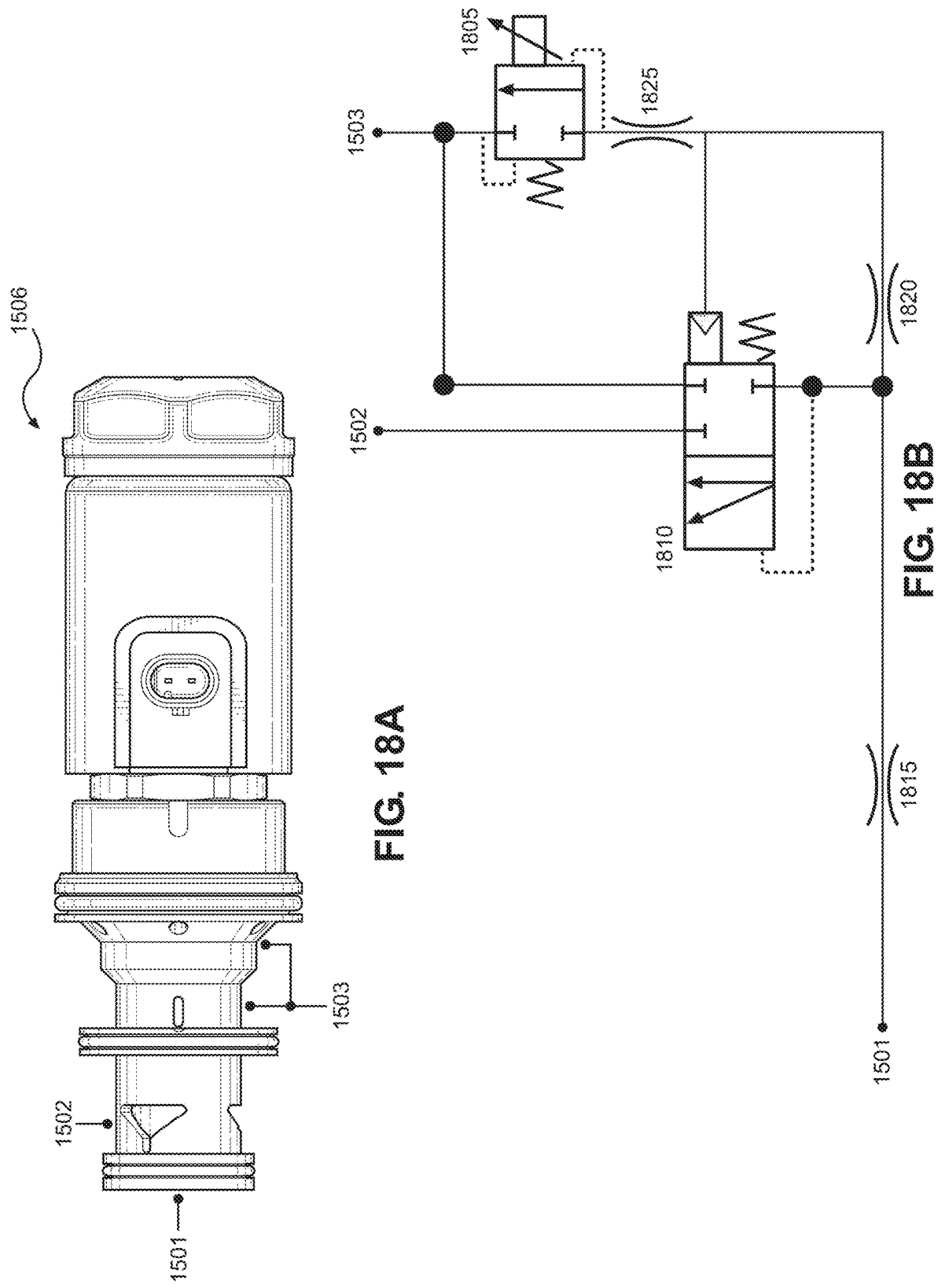
FIG. 18A is a side view of a frequency dependent 2-stage single valve 3-port adjuster with a compression chamber port, a rebound chamber port and reservoir port, in accordance with an embodiment.
FIG. 18B is a schematic diagram for the frequency dependent 2-stage single valve 3-port adjuster of FIG. 18A, in accordance with an embodiment.

FIG. 18A is a side view of a frequency dependent 2-stage single valve 3-port adjuster 1506 with a compression chamber port 1501, a rebound chamber port 1502 and reservoir port 1503 shown in accordance with an embodiment. In one embodiment, the frequency dependent 2-stage single valve 3-port adjuster 1506 has optionally tunable valving. In one embodiment, the frequency dependent 2-stage single valve 3-port adjuster 1506 is in a 3-port semiactive, pressure-relief configuration. In one embodiment, the pilot solenoid valving of frequency dependent 2-stage single valve 3-port adjuster 1506 could be replaced with a mechanical, pneumatic, hydraulic adjuster, or the like. In one embodiment, as described herein, the spool orifice is large relative to the adjuster flow, such that the pilot pressure builds up over time.

FIG. 18B is a schematic diagram for the frequency dependent 2-stage single valve 3-port adjuster 1506 of FIG. 18A shown in accordance with an embodiment. In one embodiment, as shown in the schematic diagram, frequency dependent 2-stage single valve 3-port adjuster 1506 includes an optionally tunable main stage inlet 1815 providing a fluid flow pathway via the compression chamber port 1501, a spool 1810 providing a fluid flow pathway via the rebound chamber port 1502 and a fluid flow pathway via the reservoir port 1503, a spool orifice 1820, an optionally tunable solenoid inlet orifice 1825, and a pilot solenoid 1805 providing fluid flow via the reservoir port 1503.

In one embodiment, spool orifice 1820 is a current primary tunable orifice. In one embodiment, optionally tunable solenoid inlet orifice 1825 is used with pressure balanced high-flow pilot valves. In one embodiment, optionally tunable main stage inlet 1815 may be used with smaller shocks to increase high speed forces.

Figure 19:
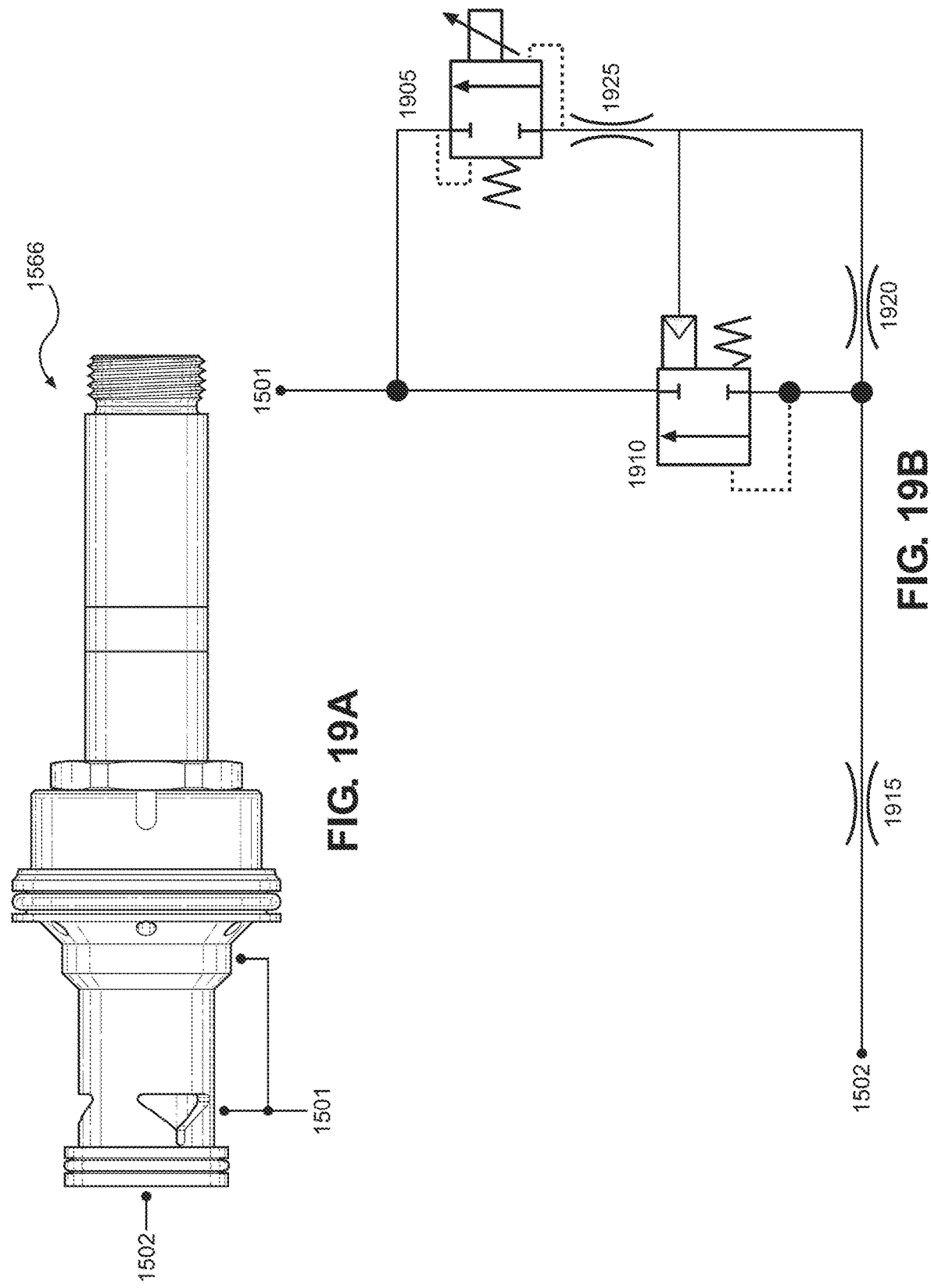
FIG. 19A is a side view of a frequency dependent 2-stage single valve 2-port adjuster, in accordance with an embodiment.
FIG. 19B is a schematic diagram for the frequency dependent 2-stage single valve 2-port adjuster of FIG. 19A, in accordance with an embodiment.

FIG. 19A is a side view of a frequency dependent 2-stage single valve 2-port adjuster 1566 shown in accordance with an embodiment. In one embodiment, the frequency dependent 2-port valve includes a compression chamber port 1501 and a rebound chamber port 1502.

FIG. 19B is a schematic diagram for the frequency dependent 2-stage single valve 2-port adjuster of FIG. 19A shown in accordance with an embodiment. In one embodiment, the schematic diagram includes an optionally tunable main stage inlet 1915 providing a fluid flow pathway via the rebound chamber port 1502, a spool 1910 providing a fluid flow pathway to/from the compression chamber port 1501, a spool orifice 1920, an optionally tunable solenoid inlet orifice 1925, and a pilot solenoid valve 1905 providing another fluid flow path via the compression chamber port 1501. In one embodiment, spool orifice 1920 is a current primary tunable orifice. In one embodiment, optionally tunable solenoid inlet orifice 1925 is used with pressure balanced high-flow pilot valves. In one embodiment, optionally tunable main stage inlet 1915 may be used with smaller shocks to increase high speed forces. In one embodiment, the pilot solenoid valve 1905 could be replaced with a different type of adjuster, such as a mechanical, pneumatic, hydraulic, and the like.

Figure 20:
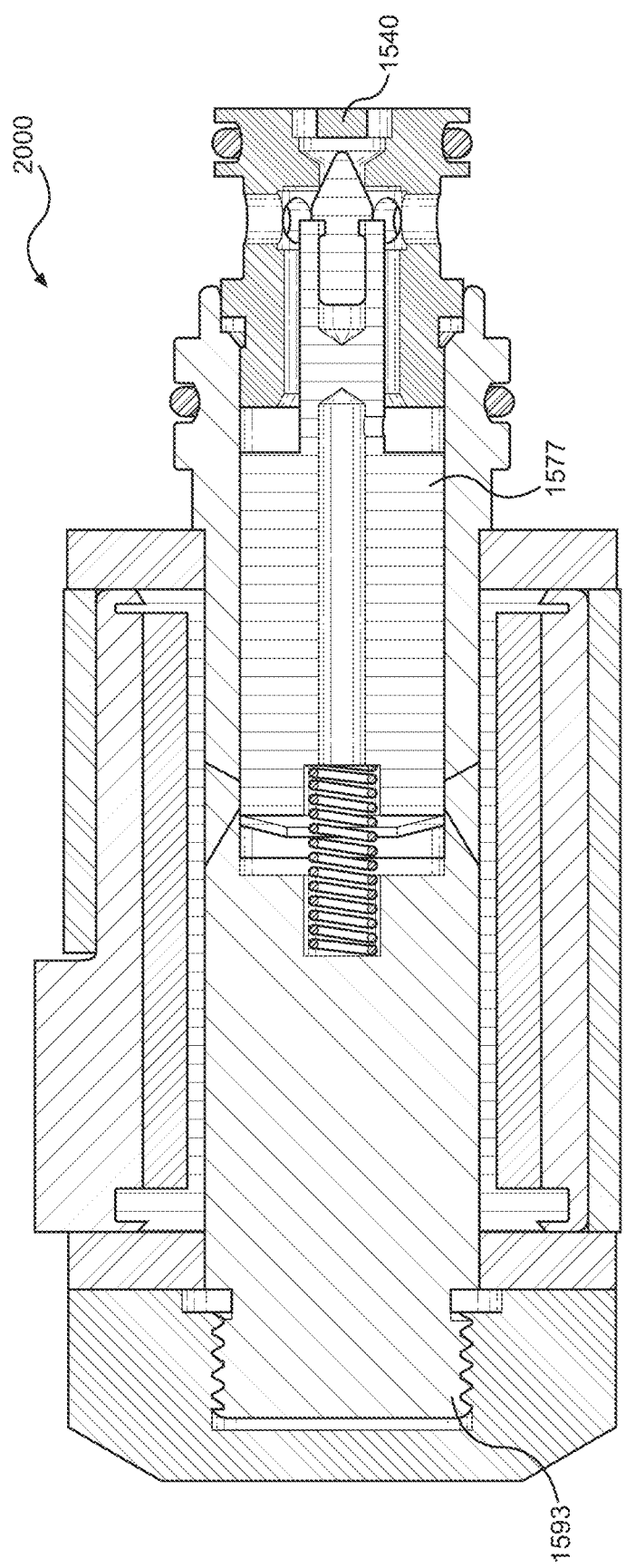
FIG. 20 is a section view of an active or semi-active valve, in accordance with an embodiment.

With reference now to FIG. 20, a section view of an active or semi-active valve 2000 is shown in accordance with an embodiment. In general, active or semi-active valve 2000 illustrates a basic operation of an active (or solenoid) valve. In one embodiment, when the coil is energized in the active valve 2000, the armature 1577 and pole piece 1593 are both magnetized, reducing the spring preload. Additional active and semi-active valve features and examples are described and shown in U.S. Pat. Nos. 8,627,932; 8,857,580; 9,033,122; 9,120,362; and 9,239,090 the content of which are incorporated by reference herein, in their entirety.

In one embodiment, transducers located at the suspension damper measure piston rod velocity (piston rod velocity transducer), and piston rod position (piston rod position transducer), are used to determine when the coil should be energized in the active or semi-active valve. Additional examples and embodiments for transducer-operated arrangement for measuring piston rod speed and velocity are described in U.S. Pat. Nos. 9,623,716 and 10,036,443 the content of which is incorporated by reference herein, in its entirety.

In one embodiment, while transducers located at the suspension damper measure piston rod velocity (piston rod velocity transducer), and piston rod position (piston rod position transducer), a separate wheel speed transducer for sensing the rotational speed of a wheel about an axle includes housing fixed to the axle and containing therein, for example, two permanent magnets. In one embodiment, the magnets are arranged such that an elongated pole piece commonly abuts first surfaces of each of the magnets, such surfaces being of like polarity. Two inductive coils having flux-conductive cores axially passing therethrough abut each of the magnets on second surfaces thereof, the second surfaces of the magnets again being of like polarity with respect to each other and of opposite polarity with respect to the first surfaces. Additional examples and embodiments of wheel speed transducers are described in U.S. Pat. Nos. 9,033,122; 9,452,654; 10,040,329; 10,047,817; 10,060,499 the content of which are incorporated by reference herein, in their entirety.

FIG. 21A is a perspective view of an internal bypass configuration 2118 shown in accordance with an embodiment. FIG. 21B is an exploded view of the position sensitive element 1020 of the internal bypass configuration 2118 shown in accordance with an embodiment. Referring now to FIGS. 21A and 21B, in one embodiment, instead of a single round hole per bypass shim (e.g., a checking element), the internal bypass 2118 has a position sensitive element 1020 with multiple holes 2121 and/or one or more slot(s) 2120. Position sensitive element 1020 also includes one or more shims (e.g., shims 2122*a*-2122*n*) and one or more retaining devices 2125 to retain the shims within the slot 2120 and with the appropriate orientation with respect to the multiple holes 2121. In one embodiment, the one or more retaining devices 2125 may be screws, rivets, bolts, or the like.

In general, during rebound, the shims 2122a-2122n of optional position sensitive element 1020 close up and prevent any fluid flow therethrough. In contrast, during compression, the shims 2122a-2122n are able to open and fluid can flow out of the compression chamber 114 down the bypass 2118 to the reflow holes 1010 and back into the rebound chamber 116. In one embodiment, the shims of optional position sensitive element 1020 are effectively stiffer for the holes 2121 closer to the one or more retaining devices 2125 (e.g., a pivot 2144 shown in FIG. 21C) as such, optional position sensitive element 1020 can be used to change the effective shim stiffness with piston position (another tuning parameter).

Referring now to FIG. 21C, a sectional view of internal bypass 2118 of FIGS. 21A and 21B installed in a damper 2100 is shown in accordance with one embodiment. In one embodiment, damper 2100 may include one or more of the damper features discussed herein. In one embodiment, the base valve 905 is optional. In one embodiment, instead of a single round hole per checking element, the internal bypass 2118 of damper 2100 has a position sensitive element 1020 with multiple holes 2121 replacing a single checking element, thereby increasing the position sensitivity per checking element. In FIG. 21C, the damper 2100 is shown in a compression bypass.

In one embodiment, additional relief has been added to one or more of the multiple holes 2121. In one embodiment, the additional relief is in the form of counterbores. However, in another embodiment, the additional relief could use other shapes such as, countersinks, slots, and the like when forming the one or more multiple holes 2121. In one embodiment, multiple holes 2121 are position sensitive. In one embodiment, the effective stiffness of the shims 2122a-2122n (e.g., reed valves or the like) increases with stroke, as the remaining of the multiple holes 2121 are closer to the pivot 2144. In one embodiment, the pivot 2144 refers to a point just before the one or more retaining devices 2125, where shims 2122a-2122n are likely stiff enough to not bend significantly. In one embodiment, the pivot 2144 is at the edge of the retaining devices 2125.

In one embodiment, one or more position sensitive element 1020 will provide additional position sensitivity per bypass shim. In general, the more checking elements in parallel, the more likely one of them will stick, especially in a colder environment. However, by providing all the holes under one element (e.g., position sensitive element 1020), the check shim is less prone to sticking in the cold and therefore, more consistent. In one embodiment, as discussed herein, counterbores may also be added to reduce the proneness for sticking. In one embodiment, providing all the holes 2121 under one position sensitive element 1020 will also save manufacturing costs.

Figure 21D:
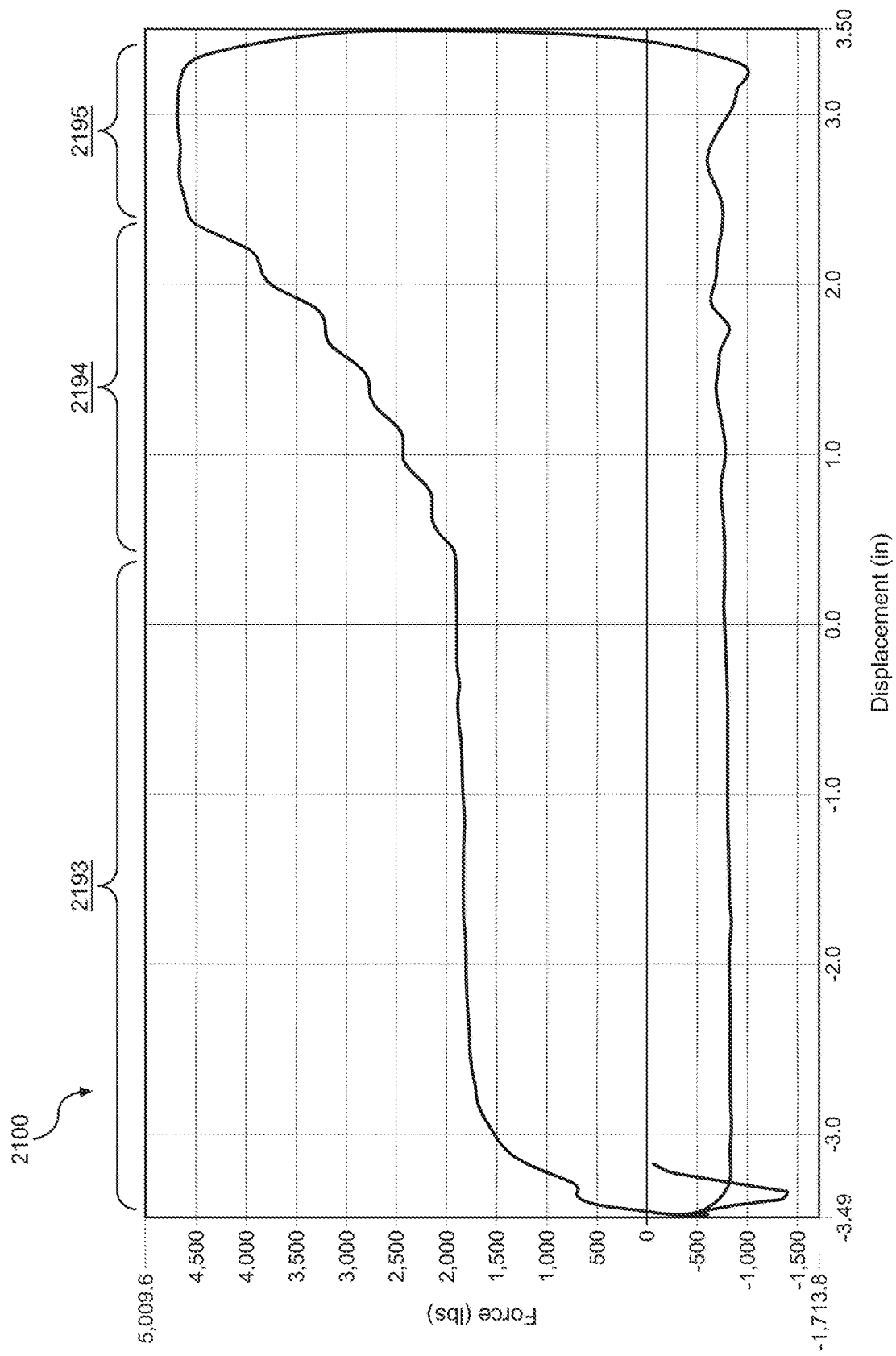
FIG. 21D is a graph of displacement (inches) vs. force (lbs.) for the internal bypass on a damper with at least one position sensitive element, in accordance with an embodiment.

With reference now to FIG. 21D, a graph of displacement (inches) vs. force (lbs) for the internal bypass 2118 on a damper 2100 with at least one position sensitive element 1020 is shown in accordance with an embodiment. In general, the graph of FIG. 21D includes a ride zone 2193, a transitional area 2194, and then an end zone 2195 of the damper 2100 displacement. In one embodiment, as shown in the graph, the use of the position sensitive element 1020 for the internal bypass 2118 creates a smoother transition during the transitional area 2194 between the ride zone 2193 and the end zone 2195.

The examples set forth herein were presented in order to best explain, to describe particular applications, and to thereby enable those skilled in the art to make and use embodiments of the described examples. However, those skilled in the art will recognize that the foregoing description and examples have been presented for the purposes of illustration and example only. The description as set forth is not intended to be exhaustive or to limit the embodiments to the precise form disclosed. Rather, the specific features and acts described above are disclosed as example forms of implementing the Claims.

Reference throughout this document to "one embodiment," "certain embodiments," "an embodiment," "various embodiments," "some embodiments," "various embodiments", or similar term, means that a particular feature, structure, or characteristic described in connection with that embodiment is included in at least one embodiment. Thus, the appearances of such phrases in various places throughout this specification are not necessarily all referring to the same embodiment. Furthermore, the particular features, structures, or characteristics of any embodiment may be combined in any suitable manner with one or more other features, structures, or characteristics of one or more other embodiments without limitation.

The foregoing Description of Embodiments is not intended to be exhaustive or to limit the embodiments to the precise form described. Instead, The examples set forth herein were presented in order to best explain, to describe particular applications, and to thereby enable those skilled in the art to make and use embodiments of the described examples. However, those skilled in the art will recognize that the foregoing description and examples have been presented for the purposes of illustration and example only. The description as set forth is not intended to be exhaustive or to limit the embodiments to the precise form disclosed. Rather, the specific features and acts described above are disclosed as example forms of implementing the Claims and their equivalents.

What is claimed is:

1. A frequency dependent 2-stage multi-port adjuster for a vehicle suspension damper, said frequency dependent 2-stage multi-port adjuster comprising:

a first port to provide a fluid flow path to a compression region of a damping cylinder;

a second port to provide a fluid flow path to a rebound region of said damping cylinder;

a third port to provide a fluid flow path to a reservoir chamber; and at least one valve to control a fluid flow therethrough, said at least one valve comprising:

a pilot inlet; and a pilot valve orifice, wherein said pilot inlet is larger in diameter than said pilot valve orifice, wherein said at least one valve comprises:

an electronic valve configured to control a flow of a fluid through at least one of said first port, said second port, and said third port.

2. A frequency dependent 2-stage multi-port adjuster for a vehicle suspension damper, said frequency dependent 2-stage multi-port adjuster comprising:

a first port to provide a fluid flow path to a compression region of a damping cylinder;

a second port to provide a fluid flow path to a rebound region of said damping cylinder;

a third port to provide a fluid flow path to a reservoir chamber; and at least one valve to control a fluid flow therethrough, said at least one valve comprising:

a pilot inlet; and a pilot valve orifice, wherein said pilot inlet is larger in diameter than said pilot valve orifice, wherein said damping cylinder further comprises:

an interior chamber in which a main piston travels;

an annular chamber which surrounds said interior chamber to form an internal bypass fluid pathway, said internal bypass fluid pathway for bypassing said main piston in said interior chamber, said main piston separating said rebound region of said interior chamber from said compression region of said interior chamber; and at least one position sensitive element located at a portion of said internal bypass fluid pathway along said compression region of said interior chamber, said at least one position sensitive element proving a bypass fluid pathway through said annular chamber and into said interior chamber, wherein said at least one position sensitive element prevents said fluid flow therethrough during a rebound of said vehicle suspension damper, and said at least one position sensitive element allows said fluid flow therethrough during at least a first portion of a compression of said vehicle suspension damper.

3. A frequency dependent 2-stage multi-port adjuster for a vehicle suspension damper, said frequency dependent 2-stage multi-port adjuster comprising:

a first port to provide a fluid flow path to a compression region of a damping cylinder;

a second port to provide a fluid flow path to a rebound region of said damping cylinder;

a third port to provide a fluid flow path to a reservoir chamber; and at least one valve to control a fluid flow therethrough, said at least one valve comprising:

a pilot inlet; and a pilot valve orifice, wherein said pilot inlet is larger in diameter than said pilot valve orifice, wherein said damping cylinder further comprises:

an interior chamber in which a main piston travels;

an annular chamber which surrounds said interior chamber to form an internal bypass fluid pathway, said internal bypass fluid pathway for bypassing said main piston in said interior chamber, said main piston separating said rebound region of said interior chamber from said compression region of said interior chamber; and at least one position sensitive element located at a portion of said internal bypass fluid pathway along said compression region of said interior chamber, said at least one position sensitive element proving a bypass fluid pathway through said annular chamber and into said interior chamber, wherein said at least one position sensitive element prevents said fluid flow therethrough during a rebound of said vehicle suspension damper, and said at least one position sensitive element allows said fluid flow therethrough during at least a first portion of a compression of said vehicle suspension damper; and wherein said at least one position sensitive element comprises:

a slot formed in said annular chamber, said slot not breeching said annular chamber;

a plurality of holes along said slot, each of said plurality of holes passing completely through said annular chamber;

a plurality of shims, said plurality of shims stackably covering said plurality of holes; and at least one retaining devices to retain said shims within said slot at an appropriate orientation with respect to said plurality of holes.

\* \* \* \* \*